(12) United States Patent
Blyth et al.

(10) Patent No.: US 6,599,548 B2
(45) Date of Patent: Jul. 29, 2003

(54) AMBIENT STABLE BEVERAGE

(75) Inventors: Marian Blyth, Bedford (GB); Roy Michael Kirby, Bedford (GB); Hazel Steels, Bedford (GB); Malcolm Stratford, Bedford (GB)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/855,111

(22) Filed: May 14, 2001

(65) Prior Publication Data

US 2002/0034568 A1 Mar. 21, 2002

(30) Foreign Application Priority Data

May 15, 2000 (GB) .............................. 0011675

(51) Int. Cl.⁷ .............................. A23L 2/00; A23F 3/00
(52) U.S. Cl. .................... 426/330.3; 426/335; 426/597
(58) Field of Search ............................ 426/330.3, 597, 426/335

(56) References Cited

U.S. PATENT DOCUMENTS

| | | |
|---|---|---|
| 3,870,800 A | 3/1975 | Pittet et al. |
| 3,890,370 A | 6/1975 | Búchi et al. |
| 3,928,645 A | 12/1975 | Mookherjee et al. |
| 4,000,329 A | 12/1976 | Pittet et al. |
| 4,015,024 A | 3/1977 | Horman et al. |
| 4,028,278 A | 6/1977 | Búchi et al. |
| 4,282,274 A | 8/1981 | Mookherjee et al. |
| 5,571,782 A | 11/1996 | Trinh et al. |
| 5,580,851 A | 12/1996 | Trinh et al. |
| 5,635,238 A | 6/1997 | Trinh et al. |
| 5,660,845 A | 8/1997 | Trinh et al. |
| 5,837,671 A | 11/1998 | Kaiser |
| 6,036,986 A | 3/2000 | Cirigliano et al. |
| 6,042,861 A | 3/2000 | Anslow et al. |

FOREIGN PATENT DOCUMENTS

| | | |
|---|---|---|
| EP | 0 501 094 A1 | 9/1992 |
| EP | 0 870 507 A1 | 10/1998 |
| EP | 1 077 034 A1 | 2/2001 |
| GB | 1 305 621 | 2/1973 |
| GB | 2 315 398 A | 2/1998 |

OTHER PUBLICATIONS

International Search Report (PCT/GB 01/01928)—date of mailing Aug. 3, 2001.
International Search Report (PCT/GB 01/01928)—date of mailing Nov. 14, 2001.
Patent Act 1977 Search Report under Section 17 (GB 0011675.6).
XP–002171857: "High Boiling Compounds Of Neutral Essential Oil From Tea", *Agricultural and Biological Chemistry*, vol. 36, No. 6, pp. 1027–1032—abstract.
XP–002171861: RU 2 113 133 C (Food Aromatiser Acid Dye Res. Inst.), Jun. 20, 1998, Derwent Publication—abstract.
WPI Abstract Accession No. 1999–038200 & JP 10295272 (Riken Vitamin Co), Nov. 10, 1998.
WPI Abstract Accession No. 1977–22781Y & JP 520021317 (Riken Vitamin Co), Feb. 17, 1977.

*Primary Examiner*—Anthony J. Weier

(57) ABSTRACT

An ambient stable tea based beverage that contains a tea extract and a preservative system. The preservative system contains cinnamic acid, one or more essential oils and one or more pasteurization adjuncts that become fungicidal when activated by heat.

19 Claims, 24 Drawing Sheets

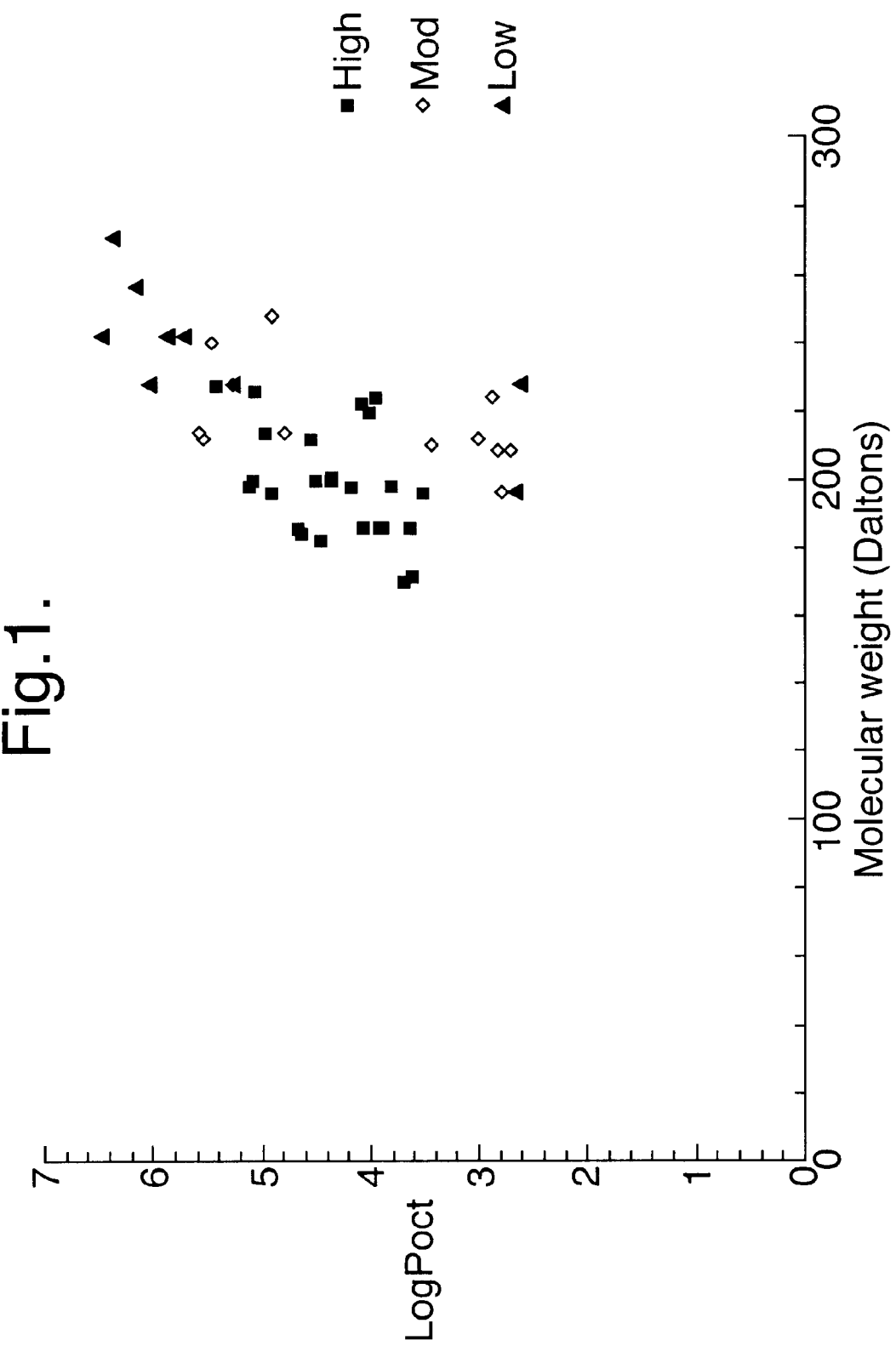

US 6,599,548 B2

AMBIENT STABLE BEVERAGE

FIELD OF THE INVENTION

The present invention relates to an ambient stable beverage, particularly a tea based beverage, that is preserved by a preservative system that comprises cinnamic acid, one or more essential oils and one or more pasteurisation adjuncts that become fungicidal when activated by heat.

BACKGROUND AND PRIOR ART

In recent years there has been an ever increasing choice for consumers who wish to quench their thirst with ready made beverages. Many of those are now turning from the well known soft drinks to tea based beverages, be those carbonated or still, and the "natural" refreshment they can provide.

Tea contains a complex combination of enzymes, biochemical intermediates and structural elements normally associated with plant growth and photosynthesis. There are also many natural substances that give tea its unique taste, astringency, aroma and colour. Many of these are produced by the oxidation reactions that occur during the so-called fermentation stage of black tea manufacture. Tea production has long been driven by traditional processing methods with only a fundamental understanding of the chemistry that is involved. As a consequence manufacturers have discovered making ambient stable tea based beverages at the volumes required to compete with more traditional soft drinks is not simply a matter of flavouring a soft drink with tea.

The flavour of a tea based beverage and its stability rely on the stability of the beverage as a whole. The fungi including yeasts and moulds that can grow in tea based beverages and other soft drinks can be killed by heat treatment or at least controlled by use of preservatives. Some tea based beverages are therefore pasteurised and then bottled in glass or special heat stable PET containers. This is known as "hot filling". Unfortunately this can be an expensive operation that creates a great deal of environmentally unfriendly waste. It has therefore become more attractive for manufacturers to pack their tea based products in standard PET containers which can range from single serve units to multi-serve packs and maintain the stability of the product using tailor made flavour and preservative systems. This is known as "cold filling". It is also useful in that one can readily use a tea concentrate or powder.

Unfortunately the use of common preservatives can affect the flavour of a tea based beverage. This is particularly true for sulphite and sorbate. Adding a strong flavour such as lemon can offset the preservative taste. However consumers are keen to experience other flavours. Furthermore, some of those consumers that were drawn to tea based products as a more healthy and natural alternative to soft drinks sometimes view preservatives as the sort of synthetic additives they would rather avoid.

Many countries have regulations that prohibit the use of certain food additives, including some fungicides and preservatives, in foods and beverages. Regulations can vary widely but there is a clear trend for foods to contain fewer and lower levels of chemical fungicides and preservatives, particularly synthetic ones.

Accordingly there is a need for pleasantly flavoured, ambient-stable, tea based beverages that have low levels of synthetic preservatives.

In response to that need the present inventors have now developed an ambient stable tea based beverage that is preserved by a preservative system that comprises cinnamic acid, one or more essential oils and one or more pasteurisation adjuncts that become fungicidal when activated by heat. Non-tea based beverages including fruit and soft drinks can be stabilised in a similar way.

STATEMENT OF THE INVENTION

The invention can in broad terms be said to relate to an ambient stable beverage, such as a tea based beverage, that is preserved by a preservative system that comprises cinnamic acid, one or more essential oils and one or more pasteurisation adjuncts that become fungicidal when activated by heat.

The beverage preferably 1 to 175 ppm cinnamic acid, 1 to 100 ppm of at least one essential oil and the pasteurisation adjunct is present in a concentration of 1 to 100 ppm. When the beverage is a tea based beverage it preferably contains 0.01 to 3% tea solids, especially about 0.14%.

The pasteurisation adjunct is a preferably a substance that has no appreciable fungicidal activity at a temperature between 0 and 40° C., especially between 20 and 35° C., but exhibits fungicidal activity when heated to a temperature between 40 and 65° C., especially between 45 and 55° C.

Particularly preferred pasteurisation adjuncts include decyl acetate, lauric acid, lauric aldehyde, lauric alcohol, 2-dodecenal, ethyl 2-decenoate, geranyl acetone, geranyl acetate which are preferably present in a concentration no greater than 1 mM, preferably no greater than 0.1 mM.

The invention can also be said to relate to a method for preparing an ambient-stable tea based beverage suitable for cold filing comprising adding cinnamic acid, one or more essential oils and one or more pasteurisation adjuncts that become fungicidal when activated by heat.

"Beverage" for the purposes of the present invention means any drink, other than water, and includes soft drinks, fruit drinks, coffee based drinks and tea based drinks.

"Essential oil" for the purposes of the present invention includes any of the volatile oils in plants having the odour or flavour of the plant from which they are extracted. It also includes one or more of the components of that oil that is or are responsible for or at least contributes to the odour or flavour of that plant.

"Tea" for the purposes of the present invention means leaf material from *Camellia sinensis* var. *sinensis* or *Camellia sinensis* var. *assamica*. "Tea" is also intended to include the product of blending two or more of any of these teas.

For the avoidance of doubt the word "comprising" is intended to mean including but not necessarily "consisting of" or "composed of". In other words the listed steps or options need not be exhaustive.

Except in the operating and comparative examples, or where otherwise explicitly indicated, all numbers in this description indicating amounts or concentrations of material ought to be understood as modified by the word "about".

BRIEF DESCRIPTION OF THE DRAWINGS

FIG. 1 is a plot of molecular weight and $logP_{oct}$ values of various pasteurisation adjuncts which enabled the forecasting of preferred pasteurisation adjuncts.

DETAILED DESCRIPTION OF THE INVENTION

Figure 2A:
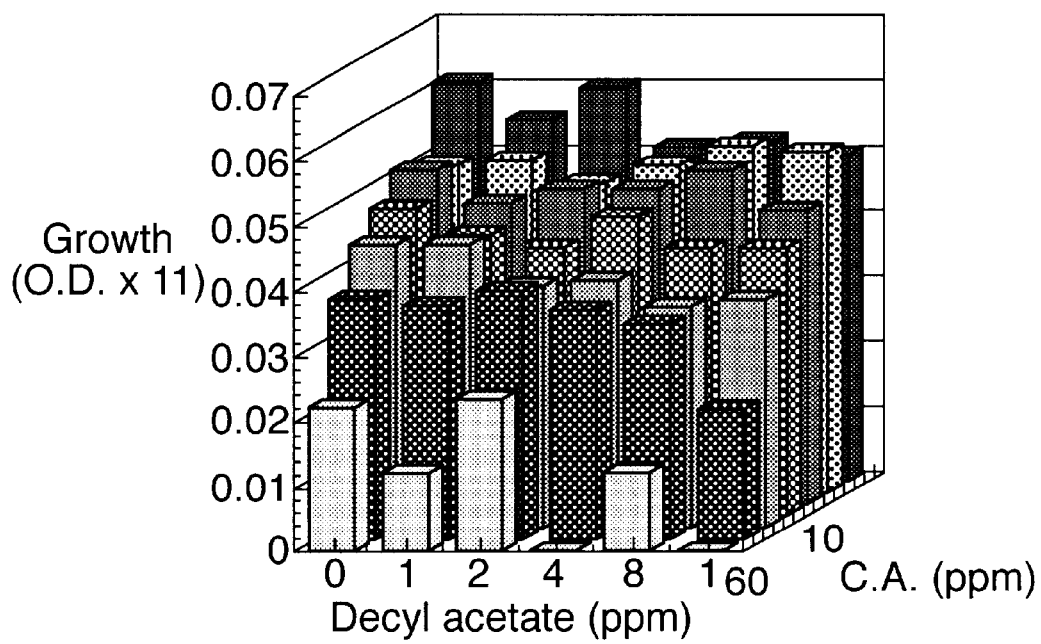
FIGS. 2a/b show the prevention of yeast growth by low levels of the pasteurisation adjunct, decyl acetate, applied in Ready to Drink tea, 0.14% tea, in combination with the preservative, cinnamic acid.

The ambient stable beverage of the present invention is preserved by a preservative system comprising cinnamic acid, one or more essential oils and one or more pasteurisation adjuncts that become fungicidal when activated by heat.

Cinnamic Acid

Cinnamic acid (3-phenyl-2-propenoic acid) is a well known flavouring agent for cakes, drinks, chewing gum and ice cream. Derived from cinnamon, which has long been added to foods, it is regarded in most countries as a useful and harmless flavouring. When dissolved in a tea based beverage cinnamic acid imparts a mild resinous odour resembling honey and flowers with a sweet and weak spicy taste. A flavouring effect is evident at concentrations above about 10 ppm. At concentrations above 30 ppm the flavour becomes particularly strong. An additional benefit is the suppression of unwanted preservative notes from chemicals such as sorbic and benzoic acids. Of the two stereo isomers that exist, the trans-isomer is more commonly of interest for use in flavouring.

Cinnamic acid was given GRAS (i.e. Generally Recognised as Safe) status by the FEMA (Flavouring Extract Manufacturers Association) in 1965. While there is no legislation in the European Union that prevents or limits the use of cinnamic acid in food or beverages, the normal usage maximum that has previously been agreed within the industry is 31 ppm. More recently 174.9 ppm has been allowed for non-alcoholic beverages.

A number of cinnamic acid derivatives are known and used in the food industry. These include p-dimethylaminocinnamate, cinnamaldehyde, cinnamyl acetate, cinnamyl alcohol, cinnamyl benzoate, cinnamyl cinnamate, cinnamyl formate, cinnamyl isobutyrate, cinnamyl isovalerate and cinnamyl phenylacetate. For the purposes of this invention one could substitute or combine cinnamic acid with one or more of its derivatives although one would need to consider the concentrations required to achieve desired results any impact on aroma and taste.

While not wanting to be bound by theory, the present inventors believe that cinnamic acid works as a membrane active compound that at low pH increases the concentration of the membrane soluble cinnamic acid, i.e. it does not function as a classic weak acid preservative.

The beverage of the present invention preferably contains 1 to 175 ppm cinnamic acid, more preferably 1 to 60 ppm, more especially 1 to 30 ppm.

Essential Oil

The inventors tested a large number of antimicrobials and found the following to be suitable for use in the preservative system of the present invention. The minimum inhibitory concentration (MIC) is given for each compound.

TABLE I

Preferred essential oils

| COMPOUND | MIC (ppm) |
|---|---|
| Benzyl-4-hydroxybenzoate | 68 |
| 4-tert-Butylcyclohexanone | 462 |
| Carvone | 300 |
| Cinnamic acid | 148 |
| Cinnamaldehyde | 66 |
| Citral | 228 |
| Citral dimethyl acetal | 198 |
| Citronellol | 125 |
| Cumic alcohol | 450 |
| Cyclohexanebutyric acid | 68 |
| 2-Cyclohexylethyl acetate | 102 |
| trans, trans-2,4-Decadienal | 8 |
| Decanal | 47 |
| Decanol | 24 |
| Dihydrocarveol | 540 |
| 3,7-Dimethyl-1-octanol | 15.8 |
| Ethyl cyclohexanepropionate | 184 |
| Ethyl pyruvate | 1392 |
| Ethyl vanillin | 249 |
| Jasmone | 246 |
| o-Methoxycinnamaldehyde | 130 |
| Methyl anthranilate | 310 |
| α-Methyl-trans-cinnamaldehyde | 58.4 |
| Methyl eugenol | 356 |
| Methyl nonanoate | 90 |
| 2-Methyl-2-pentenal | 1274 |
| 5-Methyl-2-phenyl-2-hexenal | 162 |
| Methyl salicylate | 152 |
| 4-Methyl-5-thiazoleethanol acetate | 1110 |
| Myrtenol | 137 |
| Neomenthol | 156 |
| Nonanoic acid | 63 |
| γ-Nonanoic lactone | 63 |
| δ-Octalactone | 568 |
| Octanoic acid (caprylic) | 115 |
| 1-Octanol | 247 |
| 1-Phenyl-1,2-propanedione | 222 |
| Piperonyl acetate | 242 |
| Propyl benzoate | 66 |
| Pulegone | 152 |
| Sorbic aldehyde (2,4-hexadienal) | 86 |
| Terpinen-4-ol | 616 |
| Tolualdehyde | 240 |
| γ-Undecalactone | 28 |
| Undecanal | 34 |
| 1-Undecanol | 14 |
| Vanillin | 1216 |

The preservative system preferably contains 1 to 100 ppm of at least one essential oil. More preferably the preservative system contains 1 to 50 ppm of at least one essential oil, more especially 1 to 32.5 ppm.

Some of the aforementioned essential oils were found to be particularly preferred in respect of their impact on the taste profile of tea based beverages containing them. These are listed in Table II below. In each case the respective minimum inhibitory concentration (MIC) and their specific preferred concentration is also given.

TABLE II

Particularly preferred essential oils

| COMPOUND | MIC (ppm) | Conc (ppm) |
|---|---|---|
| Cinnamic acid | 148 | 1–60 |
| Citral | 228 | 1–30 |
| Citral dimethyl acetal | 198 | 1–30 |
| Cumic alcohol | 450 | 1–40 |
| trans, trans-2,4-Decadienal | 8 | 1–20 |
| 3,7-Dimethyl-1-octanol | 15.8 | 1–20 |
| Ethyl pyruvate | 1392 | 1–40 |
| Myrtenol | 137 | 1–20 |
| Piperonyl acetate | 242 | 1–20 |

Heat Activated Pasteurisation Adjuncts

Pasteurisation describes the process of inactivating enzymes and reducing the population of micro-organisms that occurs when a beverage is heated to a minimum temperature between 62.5 and 100° C. for a given period. One obtains a better pasteurisation by using higher temperatures and longer treatment times. In contrast to this the present invention arises from the finding that certain chemical substances that are not generally regarded as having any appreciable fungicidal activity at or near room temperature do in fact exhibit fungicidal activity when they are heated to about 50° C. This means that beverages containing such compounds can be heated to a temperature somewhat below 65° C. and yet the micro-organism population can be reduced to levels that one would expect to achieve by pasteurisation. Hence the chemical compounds can be described as pasteurisation adjuncts. But unlike pasteurisation-based methods for stabilising beverages, the performance of the present method is not time or temperature dependent. The present inventors initially found that the compounds such as decyl acetate, lauric acid, and methyl decenoate have no fungicidal activity at 30° C. and yet they exhibit significant fungicidal activity when heated to 50° C. This led them to test other compounds that have no fungicidal activity at 30° C. They found that the compounds listed in Table 1 below do indeed exhibit significant fungicidal activity when heated to 50° C. In the table the minimum inhibitory concentration (MIC) is given for each compound as well as the molecular weight (M.W.), the $logP_{oct}$ and a rating of its importance. A compound is regarded as being of high importance if a low concentration is required to exhibit a substantial fungicidal activity. The $logP_{oct}$, that is the logarithm of the partition coefficient of the relevant compound in octanol and thus a measure of its fungicidal activity, was determined using CHEMDRAW™ software from the CHEMOFFICE ULRA ENHANCED 2000™ software package (version 5.5) that is commercially available from CambridgeSoft.

TABLE 1

Compounds that exhibit fungicidal activity at 50° C. but not at 30° C.

| COMPOUND | MIC50 (mM) | M.W. | logPoct | Importance |
|---|---|---|---|---|
| Allyl cyclohexanepropionate | 1 | 196 | 3.49 | High |
| Amyl hexanoate | 2 | 186 | 3.88 | High |
| Amyl octanoate | 60 | 214 | 4.79 | Mod |

TABLE 1-continued

Compounds that exhibit fungicidal activity at 50° C. but not at 30° C.

| COMPOUND | MIC50 (mM) | M.W. | logPoct | Importance |
|---|---|---|---|---|
| Benzoin | 10 | 212 | 2.53 | 10 |
| Benzyl benzoate | 20 | 212 | 3.00 | Mod |
| Benzyl salicylate | 50 | 228 | 2.61 | Low |
| Bornyl acetate | 2 | 196 | 2.66 | Low |
| Butyl heptanoate | 5 | 186 | 3.88 | High |
| Butyl laurate | 100 | 256 | 6.16 | Low |
| Butyl 10-undecenoate | 40 | 240 | 5.46 | Mod |
| Carvyl propionate | 5 | 208.3 | 2.81 | Mod |
| β-Caryophylene | 70 | 204 | — | Low |
| Decyl acetate | 1 | 200 | 4.34 | High |
| Decyl butyrate | 70 | 228 | 5.25 | Low |
| Decyl propionate | 50 | 214.35 | 4.79 | High |
| 2-Dodecenal | <0.05 (9 ppm) | 182 | 4.44 | High |
| Ethyl decanoate | 40 | 200 | 4.34 | High |
| Ethyl 2-decenoate | 1 | 198 | 4.16 | High |
| Ethyl laurate | 80 | 228 | 5.25 | Mod |
| Ethyl nonanoate | 10 | 186 | 3.88 | High |
| Ethyl tridecanoate | 100 | 242 | 5.71 | Low |
| Ethyl undecanoate | 50 | 214 | 4.79 | Mod |
| Ethyl 10-undecenoate | 50 | 212 | 4.55 | High |
| Geranyl acetate | 1 | 196 | — | High |
| Geranyl acetone | 0.5 | 194 | — | High |
| Geranyl butyrate | 40 | 224 | — | High |
| Geranyl propionate | 12 | 210 | — | High |
| Heptyl butyrate | 2 | 186 | 3.88 | High |
| w-6-Hexadecalactone | 50 | 252 | — | Low |
| Hexadecanol | 100 | 242 | 6.48 | Low |
| Hexyl hexanoate | 30 | 201 | 4.34 | High |
| Hexyl octanoate | 10 | 228 | 5.25 | Mod |
| Isoamyl hexanoate | 5 | 186 | 3.63 | High |
| Isoamyl laurate | 120 | 270 | 6.37 | Low |
| Isoamyl salicylate | 15 | 208 | 2.71 | Mod |
| Lauric acid | 0.1 (20 ppm) | 200 | 4.49 | High |
| Lauric alcohol | 0.1 (18.6 ppm) | 186 | 4.66 | High |
| Lauric aldehyde | 0.2 (36 ppm) | 184 | 4.61 | High |
| Lauryl acetate | 40 | 228 | 5.25 | Mod |
| Linalyl acetate | 10 | 196 | 2.78 | Mod |
| Linalyl propionate | 20 | 210 | 3.43 | Mod |
| Methyl decanoate | 2 | 186 | 4.05 | High |
| Methyl laurate | 40 | 214 | 4.96 | High |
| Methyl myristate | 60 | 242 | 5.88 | Low |
| Methyl nonanoate | 2 | 172 | 3.6 | High |
| Methyl undecanoate | 50 | 200 | 4.51 | High |
| Methyl-9-undecenoate | 40 | 198 | 3.79 | High |
| Myristaldehyde | 40 | 212 | 5.53 | Mod |
| Myristic acid | 50 | 228 | 5.41 | High |
| Nerolidol | 1.5 | 222 | 4.08 | High |
| Neryl butyrate | 50 | 224 | 2.88 | Mod |
| Neryl isobutyrate | 30 | 224 | 3.94 | High |
| Nonyl acetate | 5 | 186 | 3.88 | High |
| Octyl butyrate | 40 | 200 | 4.34 | High |
| w-Pentadecalactone | 60 | 240 | — | Low |
| Pentadecanoic acid | 80 | 242 | 5.86 | Low |
| Pentadecanol | 75 | 228 | 6.03 | Low |
| Phenethyl hexanoate | 10 | 220 | 3.99 | High |
| Phenethyl octanoate | 40 | 248 | 4.90 | Mod |
| 2-Phenoxylethyl isobutyrate | 0.1 | 226 | 5.04 | High |
| Tetradecanol | 50 | 214 | 5.57 | Mod |
| Tridecanal | 5 | 200 | 5.07 | High |
| Tridecanoic acid | 0.2 | 214 | 4.95 | High |
| Tridecanol | 0.05 | 198 | 5.11 | High |
| 2-Tridecenal | <0.05 (9.8 ppm) | 196 | 4.90 | High |
| 2-Undecanone | 1 | 170 | 3.68 | High |

Many so-called pasteurisation adjuncts will provide effective fungicidal activity when heated to 50° C. or some other temperature below 65° C. However certain compounds may prove to be more appropriate than others in terms of their effect on the taste of the tea based beverage. Accordingly the present inventors have identified the following compounds as being preferred pasteurisation adjuncts for use in the method of the invention: allyl cyclohexanepropionate, amyl hexanoate, butyl heptanoate, decyl acetate, decyl propionate, 2-dodecenal, ethyl decanoate ethyl 2-decenoate, ethyl nonanoate, ethyl 10-undecenoate, geranyl acetate, geranylacetone, geranyl butyrate, geranyl propionate, heptyl butyrate, hexyl hexanoate, isoamyl hexanoate, lauric acid, lauric alcohol, lauric aldehyde, methyl decanoate, methyl laurate, methyl nonanoate, methyl undecanoate, methyl-9-undecenoate, myristic acid, nerolidol, neryl isobutyrate, nonyl acetate, octyl butyrate, phenethyl hexanoate, 2-phenoxylethyl isobutyrate, tridecanal, tridecanoic acid, tridecanol, 2-tridecenal and 2-undecanone. The pasteurisation adjuncts are preferably present in a concentration no greater than 1 mM, and especially no greater than 0.1 mM.

From that list decyl acetate, lauric acid, lauric aldehyde, lauric alcohol, 2-dodecenal, ethyl 2-decenoate, geranyl acetone, geranyl acetate are particularly preferred.

While not wanting to be bound by theory, the mode of fungicidal action of these pasteurisation adjuncts in at least tea based beverages is believed to involve disruption of microbial membranes. It is thought that at high temperatures these compounds are able to enter into membranes and cause microbial death by cell lysis.

The inventors postulated that the aforementioned compounds might not be the only compounds that might function as pasteurisation adjuncts in this way. One might define effective pasteurisation adjuncts on the basis of their Quantitative Structure Activity Relationship (QSAR) parameters. This definition would include known and hitherto unknown chemical compounds. The full list of the pasteurisation adjuncts tested above were plotted in respect of their molecular weight and $logP_{oct}$ values in FIG. 1. From that Figure the inventors forecast that preferred pasteurisation adjuncts can be defined as those that have a molecular weight between 170 and 230 daltons and a $logP_{oct}$ value between 3.5 and 5.5.

Tea Extract

The tea extract can be obtained by any suitable means. Preferably tea leaves are extracted in hot water over a period of between 20 minutes and 5 hours. The extract can be dried to form a powder, reconstituted to form an acidic beverage, or concentrated to form a syrup from which one can prepare a tea based beverage.

Tea is known to have certain antibacterial and antiviral properties in itself. One must exceed a concentration of about 3% to evidence tea beginning to suppress the growth of yeasts and moulds. At concentrations lower than this, which is typical for tea based beverages, tea acts as a nutrient that enhances the potential for microbial spoilage.

Other Factors

Water quality can seriously undermine the stability of a beverage. This is an important factor when making a tea based beverage for cold filing. For that purpose it will often be important to minimise the yeast content of water used at all stages of production. Art known methods include chlorination/dechlorination and UV irradiation.

Ambient-stable tea based beverages of the invention may be still or carbonated. Carbonation appears to provide a preservative effect in itself and therefore the formulation of a carbonated product need not be the same as a still one.

Tea based beverages commonly contain sugar or some other sweetener to counter the sometimes astringent taste of tea. Most microbes that can typically grow in tea based beverages thrive on sugar, a source of nitrogen, oxygen, zinc, magnesium, potassium, phosphate and vitamins. It is therefore advantageous to limit the sugar content to 8 to 10 degrees brix, however one could use up to 60 degrees brix when the product is a tea mix.

Oxygen content can be minimised by pre-pasteurisation or some heat treatment or nitrogen sparging. The mineral content of a tea based beverage can be minimised using EDTA, citrate, or a water softener. For example microbes can grow in tea if the concentration of magnesium ions exceeds 0.2 ppm, and they only need trace levels of zinc.

If desired the preservative system can also include ascorbic acid, a well known preservative for foodstuffs that is known to most as vitamin C.

The present invention also relates to a method for preparing an ambient-stable tea based beverage suitable for cold filing. The method comprises adding cinnamic acid, one or more essential oils and one or more pasteurisation adjuncts that become fungicidal when activated by heat.

Cinnamic acid is freely soluble in essential oils, benzene, ether, acetone, glacial acetic acid and carbon disulphide. However cinnamic acid is not readily soluble in tea and one would not want to contaminate a tea based beverages with any of the aforementioned chemicals. While the preservative system of the present invention includes one or more essential oils, it may be necessary to include a solubility enhancing step before adding the cinnamic acid to the tea solution. That can be achieved by spray drying the cinnamic acid onto a carrier powder (which may optionally be sugar based) and adding the powder to the tea, converting the acid to its salt, or dissolving the cinnamic acid in a small quantity of organic solvent such as ethanol, or propylene glycol. One can spray dry the essential oil in the same way.

The ambient stable beverage of the present invention will now be described in the following examples with reference to the accompanying drawings.

EXAMPLE 1

Ready to Drink Tea Experiments

FIGS. 2a/b show the prevention of yeast growth by low levels of the pasteurisation adjunct, decyl acetate, applied in Ready to Drink tea, 0.14% tea, in combination with the preservative, cinnamic acid. Each matrix of 30 ml tubes containing 10 ml RTD tea, pH 3.4, contained decyl acetate 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples. The pasteurisation adjunct had little effect at low temperature, 20° C. FIG. 2a, on yeast growth.

Heat+pasteurisation adjunct showed a remarkable combined synergistic effect, further enhanced by the presence of cinnamic acid.

Figure 3A:
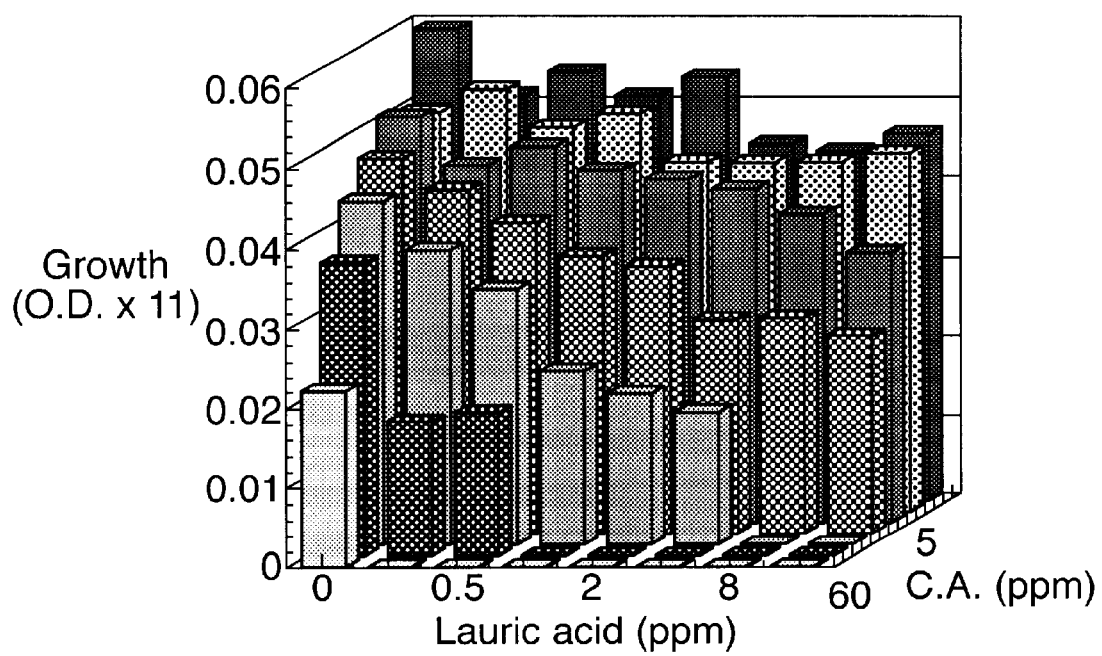
FIGS. 3a/b show the prevention of yeast growth by low levels of the pasteurization adjunct, lauric acid, applied in Ready to Drink tea, 0.14% tea, in combination with the preservative, cinnamic acid.

FIGS. 3a/b show the prevention of yeast growth by low levels of the pasteurisation adjunct, lauric acid, applied in Ready to Drink tea, 0.14% tea, in combination with the preservative, cinnamic acid. Each matrix of 30 ml tubes containing 10 ml RTD tea, pH 3.4, contained lauric acid 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples. The pasteurisation adjunct had little effect at low temperature, 20° C. FIG. 3a, on yeast growth.

Heat+pasteurisation adjunct showed a remarkable combined synergistic effect, further enhanced by the presence of cinnamic acid.

Figure 4A:
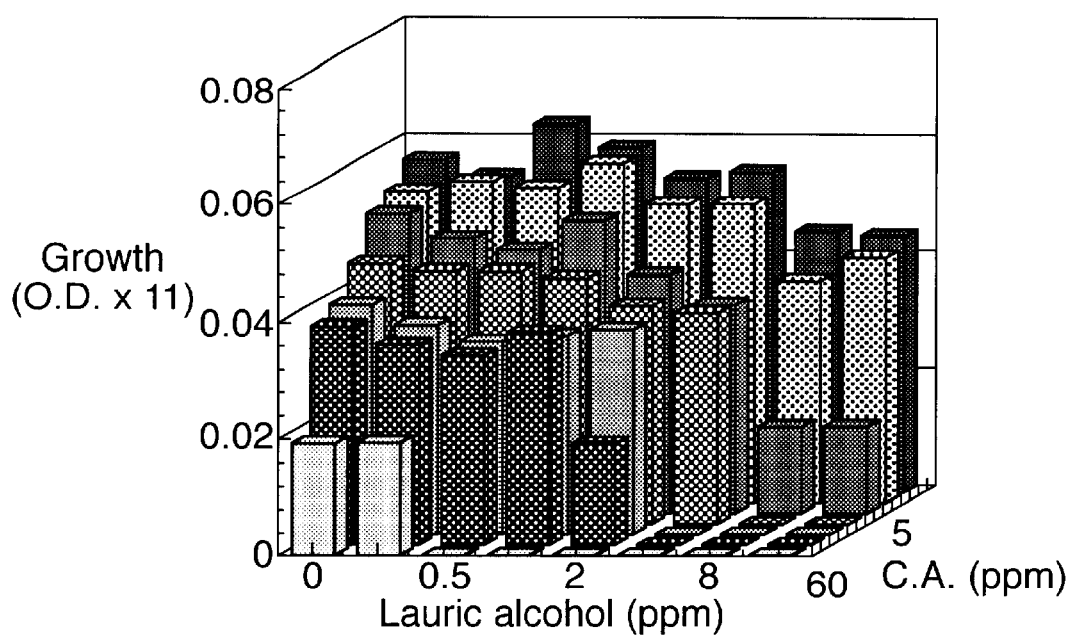
FIGS. 4a/b show the prevention of yeast growth by low levels of the pasteurisation adjunct, lauric alcohol, applied in Ready to Drink tea, 0.14% tea, in combination with the preservative, cinnamic acid.

FIGS. 4a/b show the prevention of yeast growth by low levels of the pasteurisation adjunct, lauric alcohol, applied in Ready to Drink tea, 0.14% tea, in combination with the preservative, cinnamic acid. Each matrix of 30 ml tubes containing 10 ml RTD tea, pH 3.4, contained lauric alcohol 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples. The pasteurisation adjunct had little effect at low temperature, 20° C. FIG. 4a, on yeast growth.

Heat+pasteurisation adjunct showed a remarkable combined synergistic effect, further enhanced by the presence of cinnamic acid.

Figure 5A:
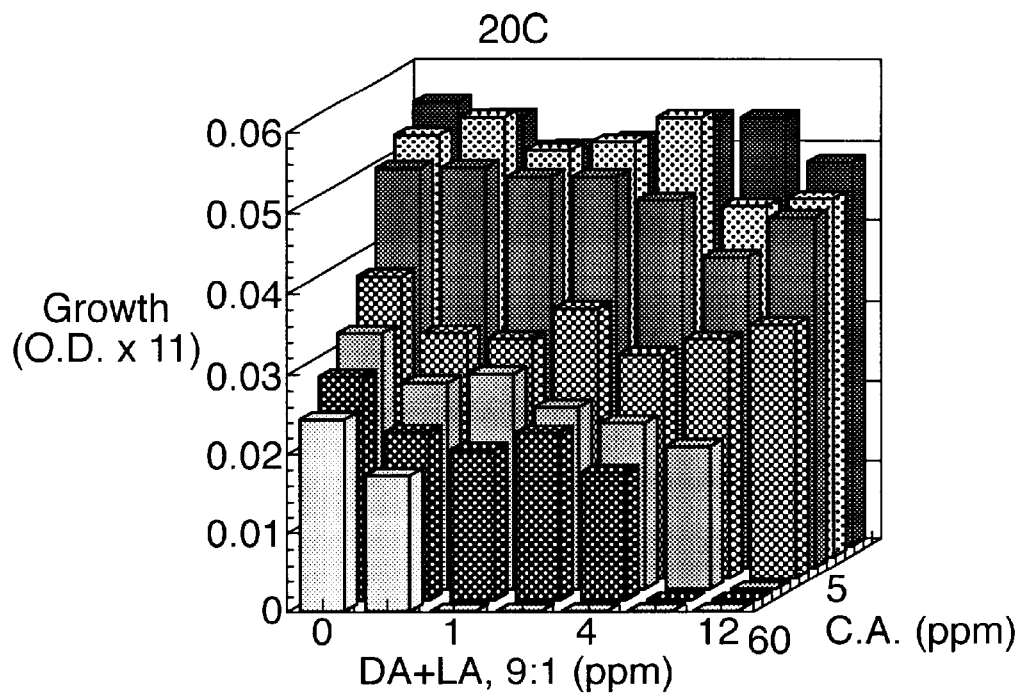
FIGS. 5a/b show the prevention of yeast growth by low levels of the pasteurisation adjuncts, decyl acetate+lauric acid, applied in Ready to Drink tea, 0.14% tea, in combination with the preservative, cinnamic acid.

FIGS. 5a/b show the prevention of yeast growth by low levels of the pasteurisation adjuncts, decyl acetate+lauric acid, applied in Ready to Drink tea, 0.14% tea, in combination with the preservative, cinnamic acid. Each matrix of 30 ml tubes containing 10 ml RTD tea, pH 3.4, contained decyl acetate+lauric acid (9:1 ratio) 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples. The pasteurisation adjunct had little effect at low temperature, 20° C. FIG. 5a, on yeast growth.

Heat+pasteurisation adjunct showed a remarkable combined synergistic effect, further enhanced by the presence of cinnamic acid.

Figure 6A:
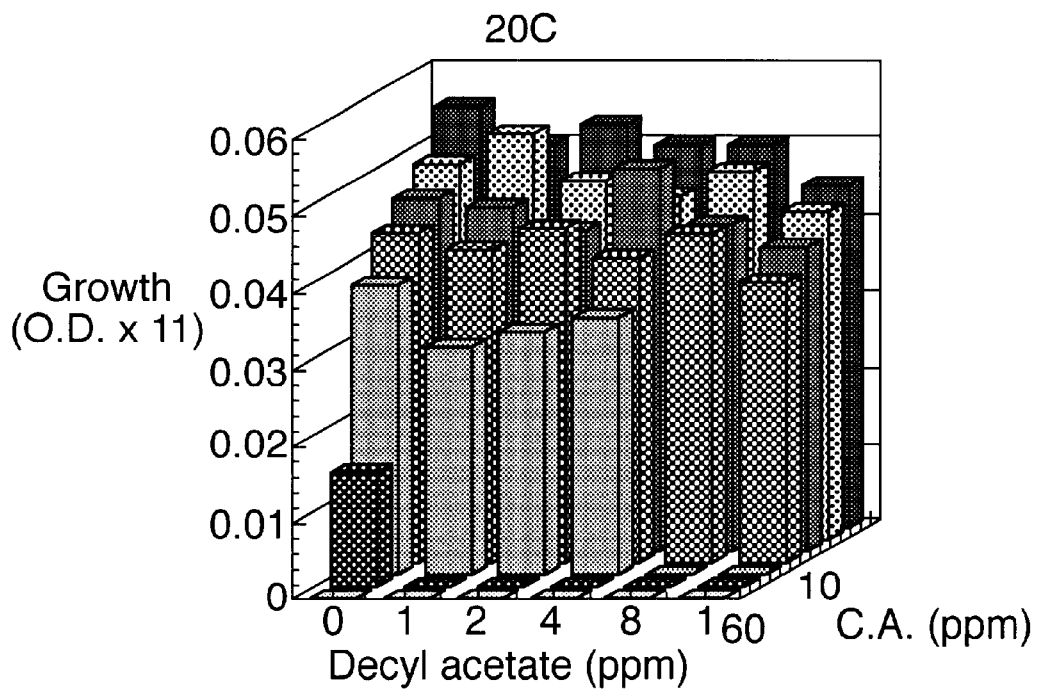
FIGS. 6a/b show the effect of pasteurisation adjunct, decyl acetate, in combination with essential oil component, cumic alcohol, applied in Ready to Drink tea, 0.14% tea, in combination with the preservative, cinnamic acid.
Figure 6B:
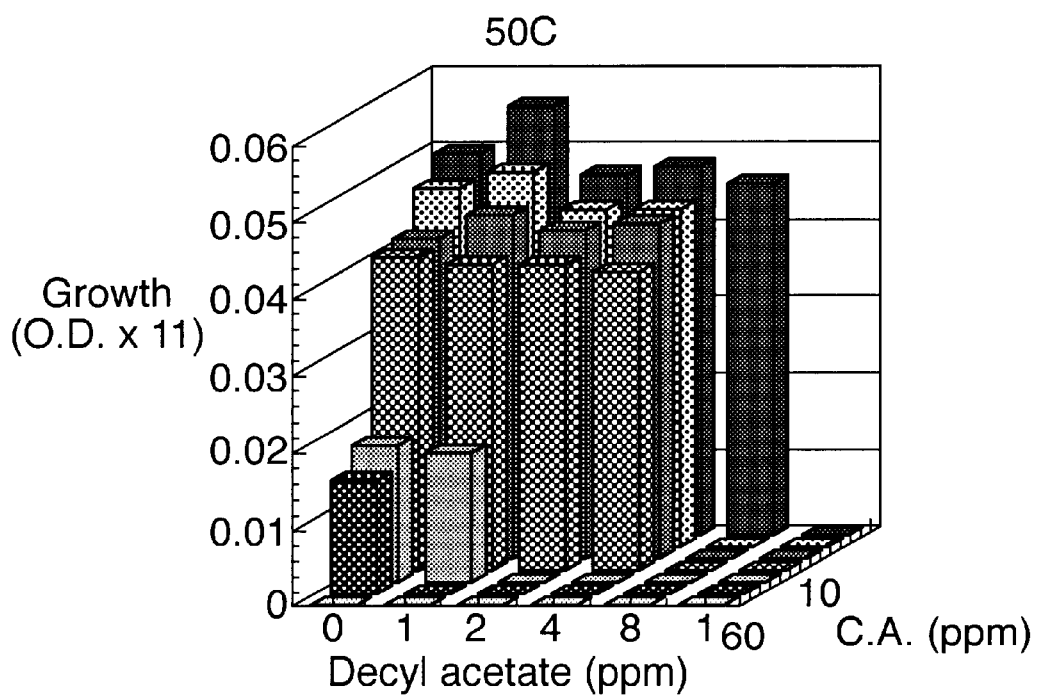

FIGS. 6a/b show the effect of pasteurisation adjunct, decyl acetate, in combination with essential oil component, cumic alcohol, applied in Ready to Drink tea, 0.14% tea, in combination with the preservative, cinnamic acid. Each matrix of 30 ml tubes containing 10 ml RTD tea, pH 3.4, all contained 100 ppm cumic alcohol, decyl acetate 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Figure 2B:
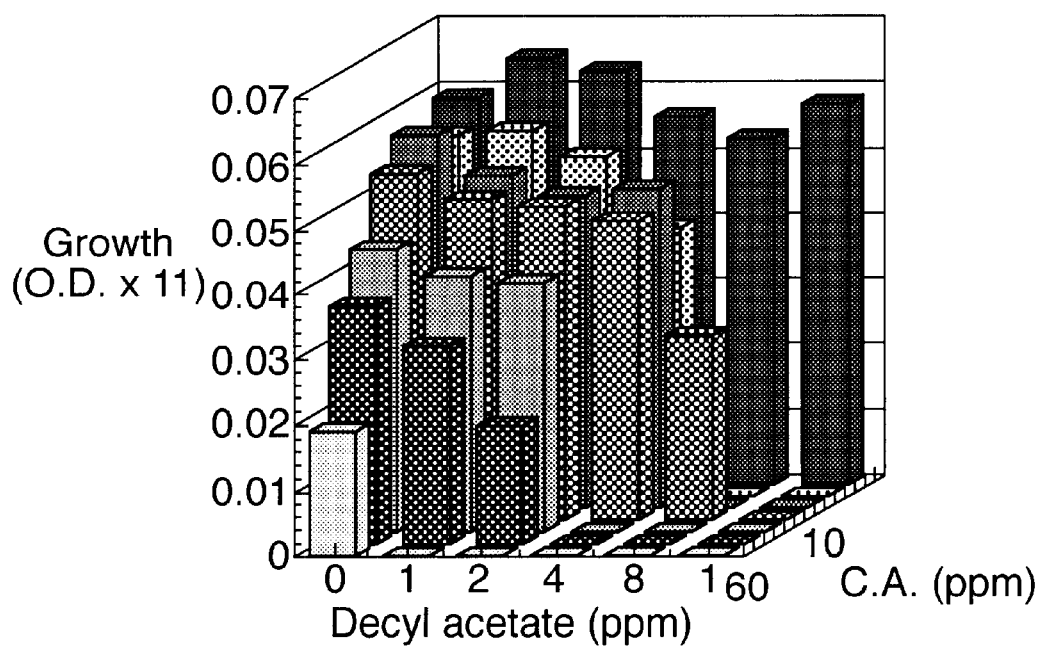

Heat+pasteurisation adjunct showed a remarkable combined synergistic effect, further enhanced by the presence of cinnamic acid and essential oil components, (compare with FIG. 2).

Figure 7A:
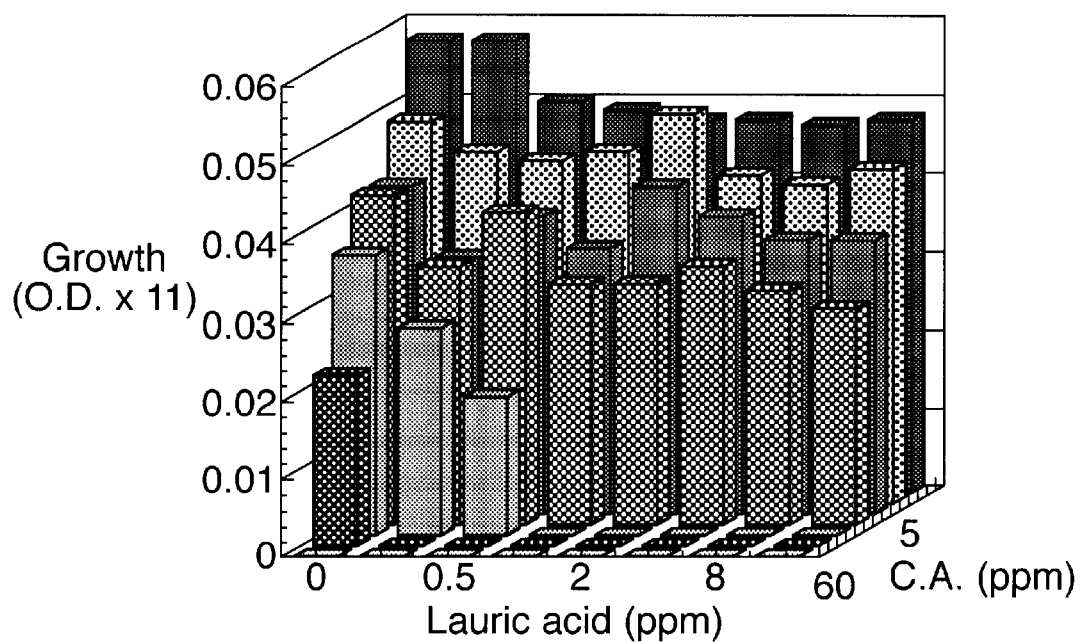
FIGS. 7a/b show the effect of pasteurisation adjunct, lauric acid, in combination with essential oil component, cumic alcohol, applied in Ready to Drink tea, 0.14% tea, in combination with the preservative, cinnamic acid.
Figure 7B:
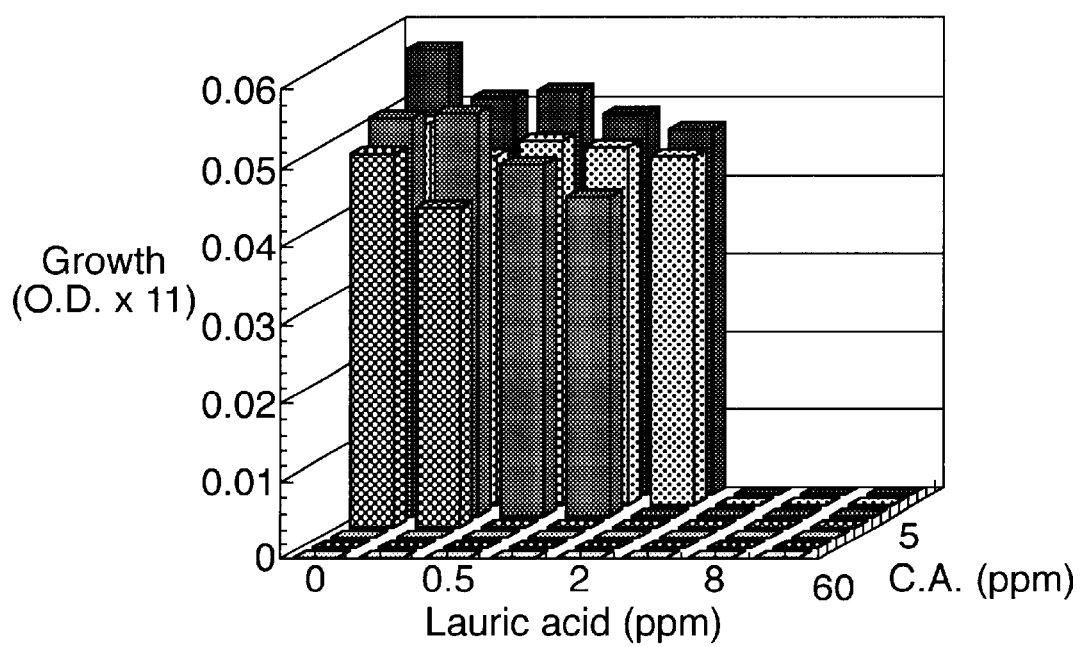

FIGS. 7a/b show the effect of pasteurisation adjunct, lauric acid, in combination with essential oil component, cumic alcohol, applied in Ready to Drink tea, 0.14% tea, in combination with the preservative, cinnamic acid. Each matrix of 30 ml tubes containing 10 ml RTD tea, pH 3.4, all contained 100 ppm cumic alcohol, lauric acid 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Figure 3B:
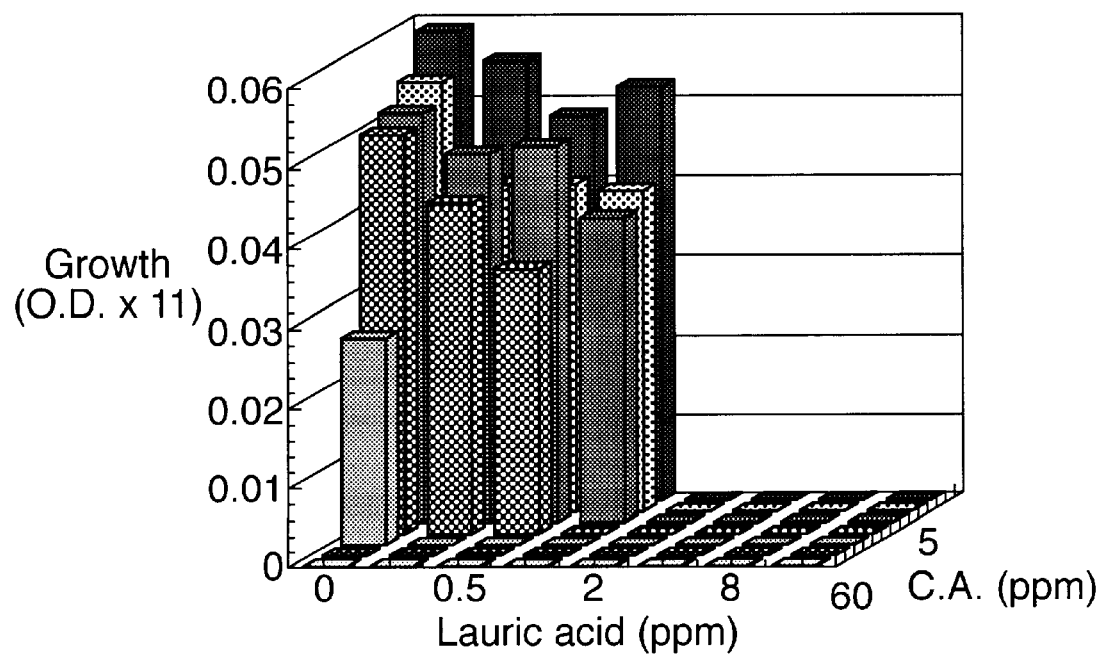

Heat+pasteurisation adjunct showed a remarkable combined synergistic effect, further enhanced by the presence of cinnamic acid and essential oil components, (compare with FIG. 3).

Figure 8A:
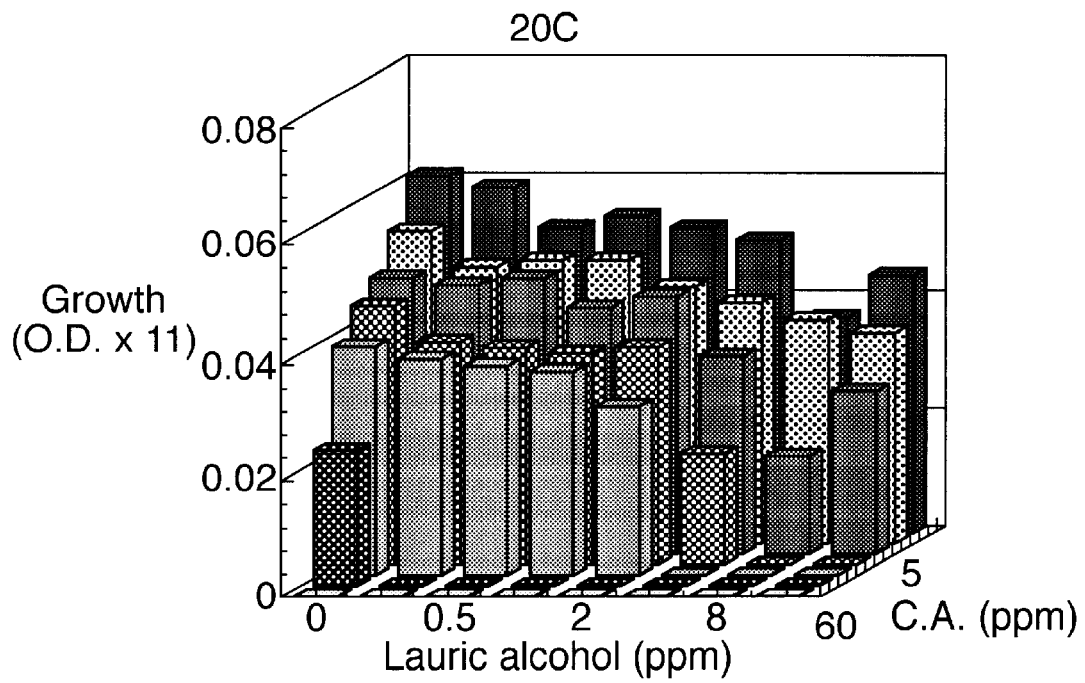
FIGS. 8a/b show the effect of pasteurisation adjunct, lauric alcohol, in combination with essential oil component, cumic alcohol, applied in Ready to Drink tea, 0.14% tea, in combination with the preservative, cinnamic acid.
Figure 8B:
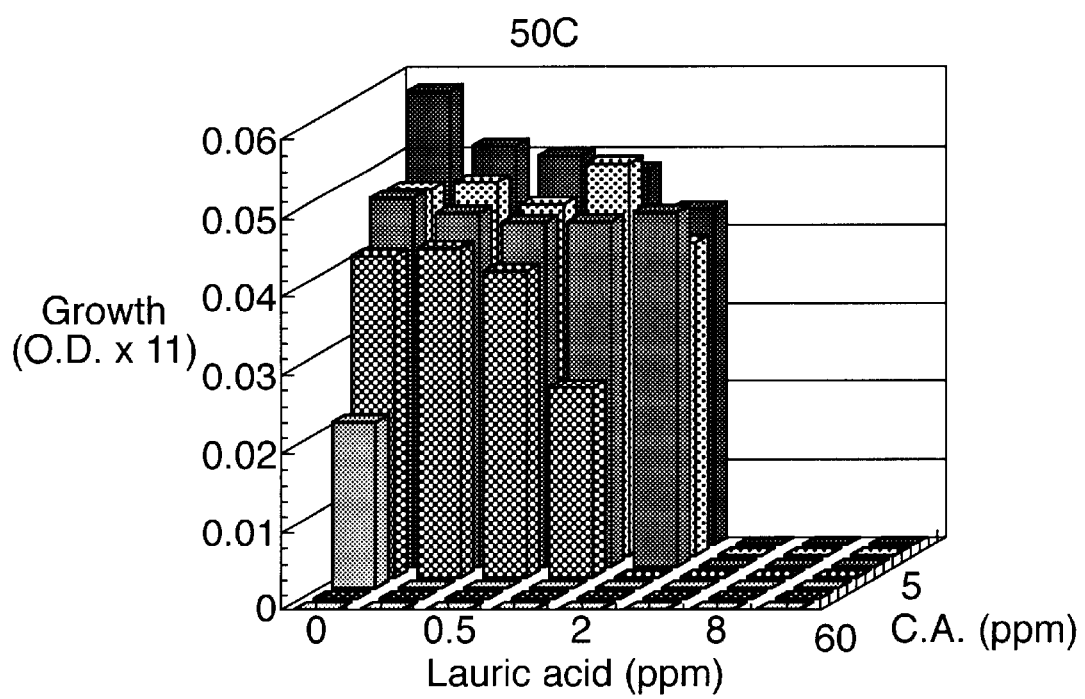

FIGS. 8a/b show the effect of pasteurisation adjunct, lauric alcohol, in combination with essential oil component, cumic alcohol, applied in Ready to Drink tea, 0.14% tea, in combination with the preservative, cinnamic acid. Each matrix of 30 ml tubes containing 10 ml RTD tea, pH 3.4, all contained 100 ppm cumic alcohol, lauric alcohol 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Figure 4B:
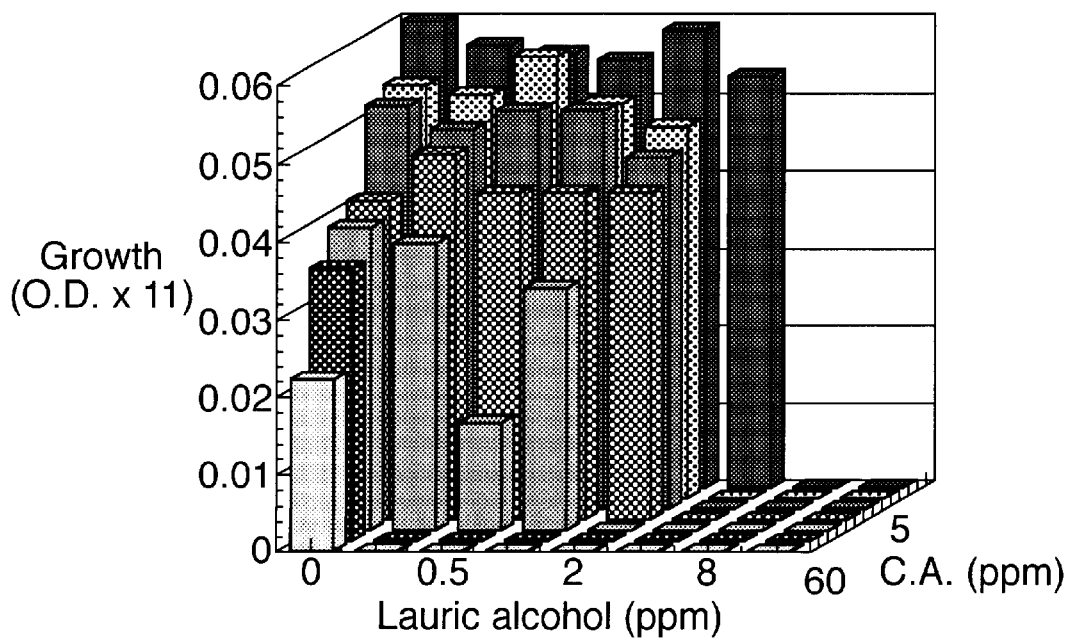

Heat+pasteurisation adjunct showed a remarkable combined synergistic effect, further enhanced by the presence of cinnamic acid and essential oil components, (compare with FIG. 4).

Figure 9A:
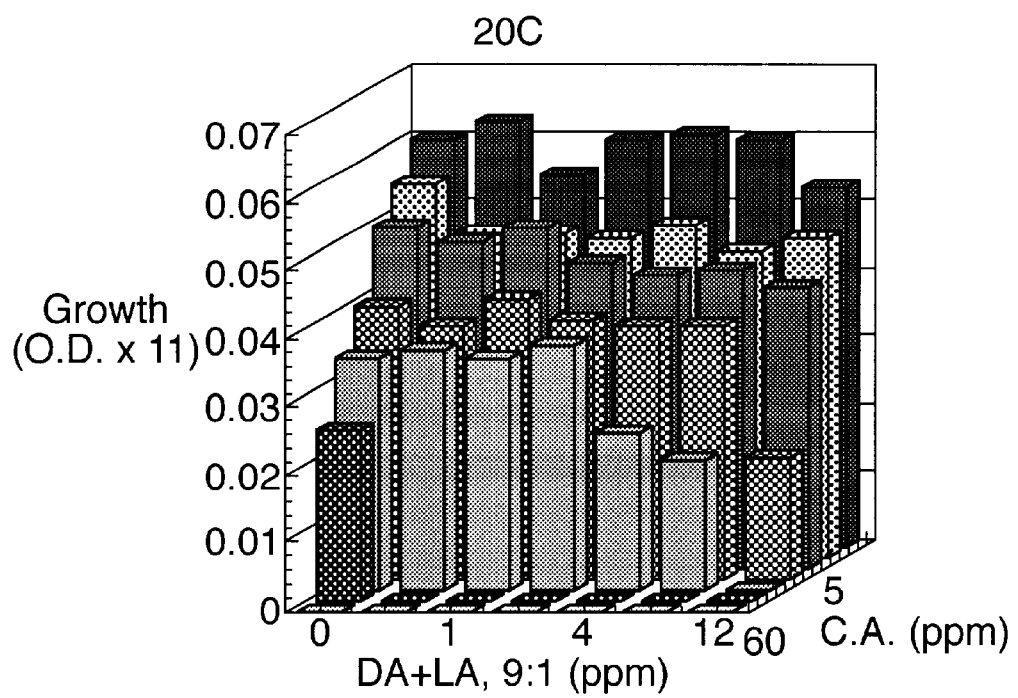
FIGS. 9a/b show the effect of mixed pasteurisation adjuncts, decyl acetate+lauric acid, in combination with essential oil component, cumic alcohol, applied in Ready to Drink tea, 0.14% tea, in combination with the preservative, cinnamic acid.
Figure 9B:
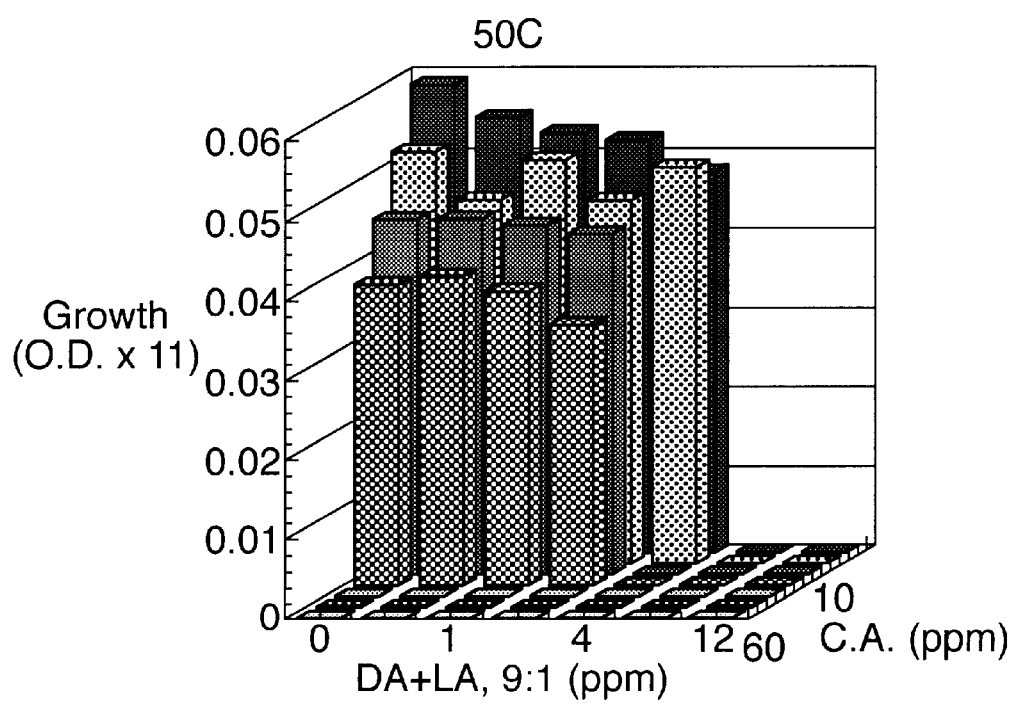

FIGS. 9a/b show the effect of mixed pasteurisation adjuncts, decyl acetate+lauric acid, in combination with essential oil component, cumic alcohol, applied in Ready to Drink tea, 0.14% tea, in combination with the preservative, cinnamic acid. Each matrix of 30 ml tubes containing 10 ml RTD tea, pH 3.4, all contained 100 ppm cumic alcohol, decyl acetate+lauric acid (9:1 ratio) 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Figure 5B:
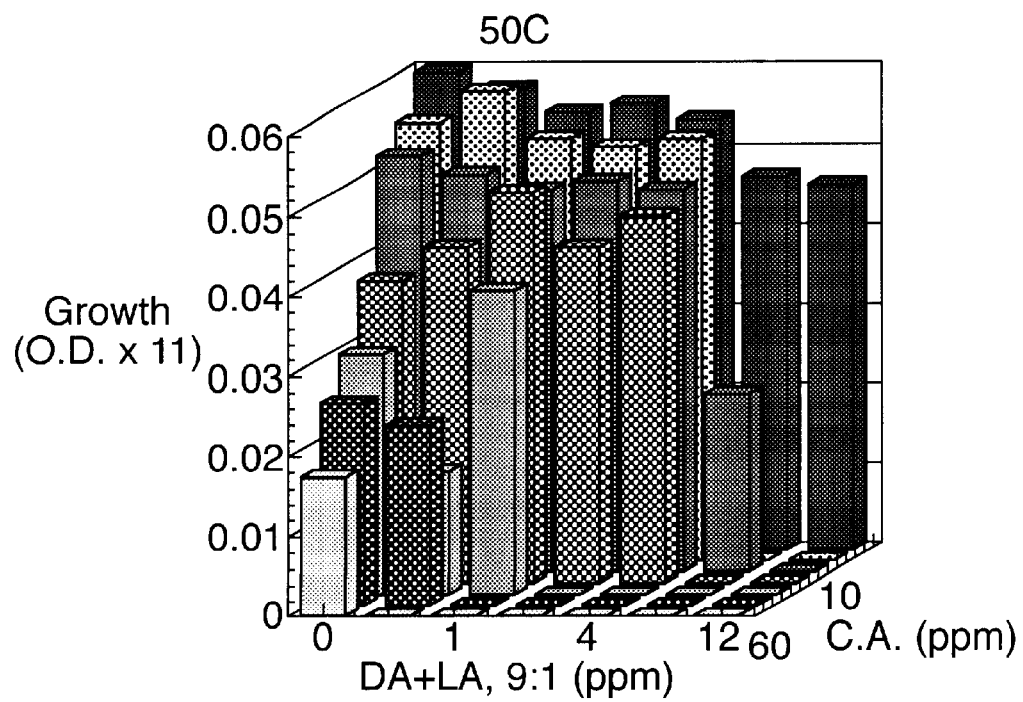

Heat+pasteurisation adjunct showed a remarkable combined synergistic effect, further enhanced by the presence of cinnamic acid and essential oil components, (compare with FIG. 5).

Figure 10A:
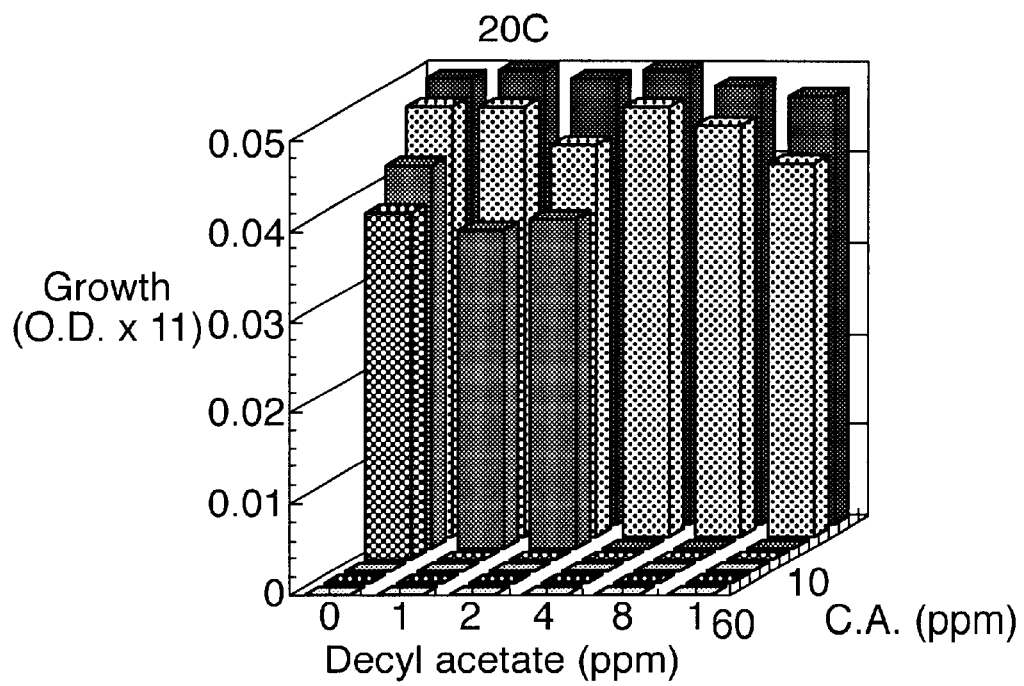
FIGS. 10a/b show the effect of pasteurisation adjunct, decyl acetate, in combination with essential oil component, citral dimethyl acetal, applied in Ready to Drink tea, 0.14% tea, in combination with the preservative, cinnamic acid.
Figure 10B:
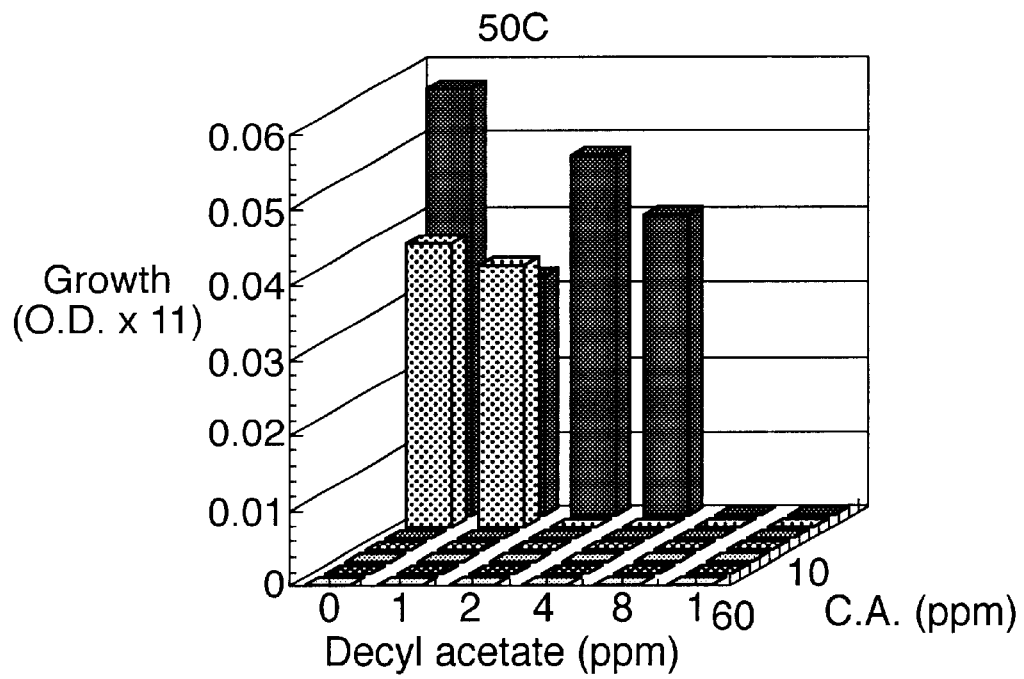

FIGS. 10a/b show the effect of pasteurisation adjunct, decyl acetate, in combination with essential oil component, citral dimethyl acetal, applied in Ready to Drink tea, 0.14% tea, in combination with the preservative, cinnamic acid. Each matrix of 30 ml tubes containing 10 ml RTD tea, pH 3.4, all contained 100 ppm citral dimethyl acetal, decyl acetate 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Heat+pasteurisation adjunct showed a remarkable combined synergistic effect, further enhanced by the presence of cinnamic acid and essential oil components, (compare with FIG. 2).

Figure 11A:
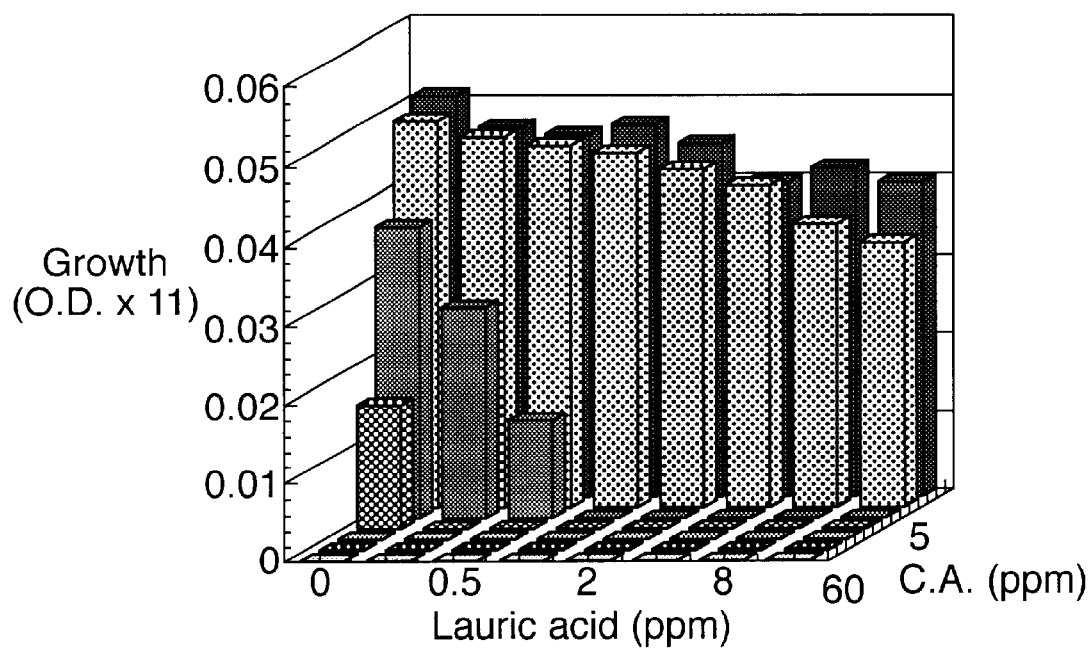
FIGS. 11a/b show the effect of pasteurisation adjunct, lauric acid, in combination with essential oil component, citral dimethyl acetal, applied in Ready to Drink tea, 0.14% tea, in combination with the preservative, cinnamic acid.
Figure 11B:
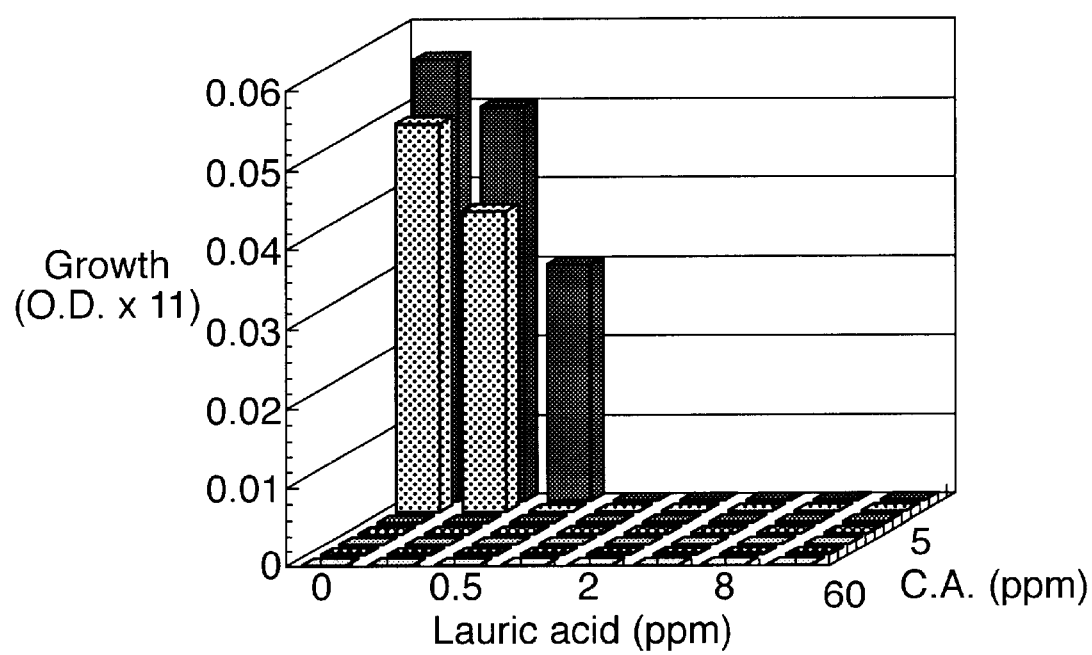

FIGS. 11a/b show the effect of pasteurisation adjunct, lauric acid, in combination with essential oil component, citral dimethyl acetal, applied in Ready to Drink tea, 0.14% tea, in combination with the preservative, cinnamic acid. Each matrix of 30 ml tubes containing 10 ml RTD tea, pH 3.4, all contained 100 ppm citral dimethyl acetal, lauric acid 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Heat+pasteurisation adjunct showed a remarkable combined synergistic effect, further enhanced by the presence of cinnamic acid and essential oil components, (compare with FIG. 3).

Figure 12A:
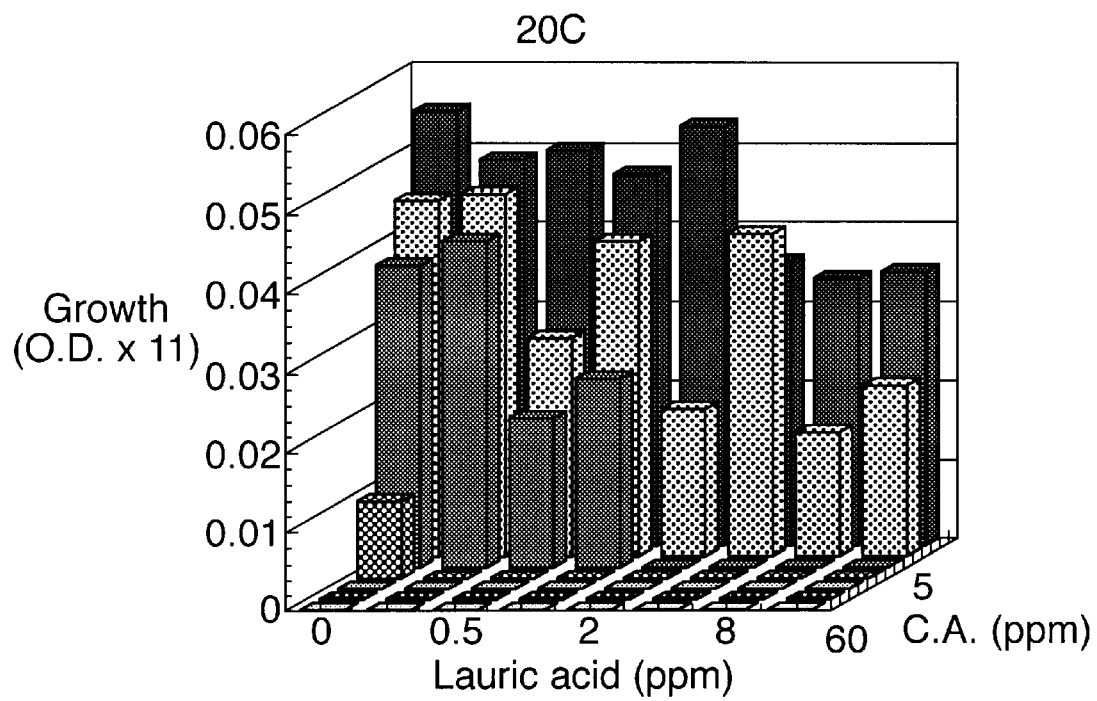
FIGS. 12a/b show the effect of pasteurisation adjunct, lauric alcohol, in combination with essential oil component, citral dimethyl acetal, applied in Ready to Drink tea, 0.14% tea, in combination with the preservative, cinnamic acid.
Figure 12B:
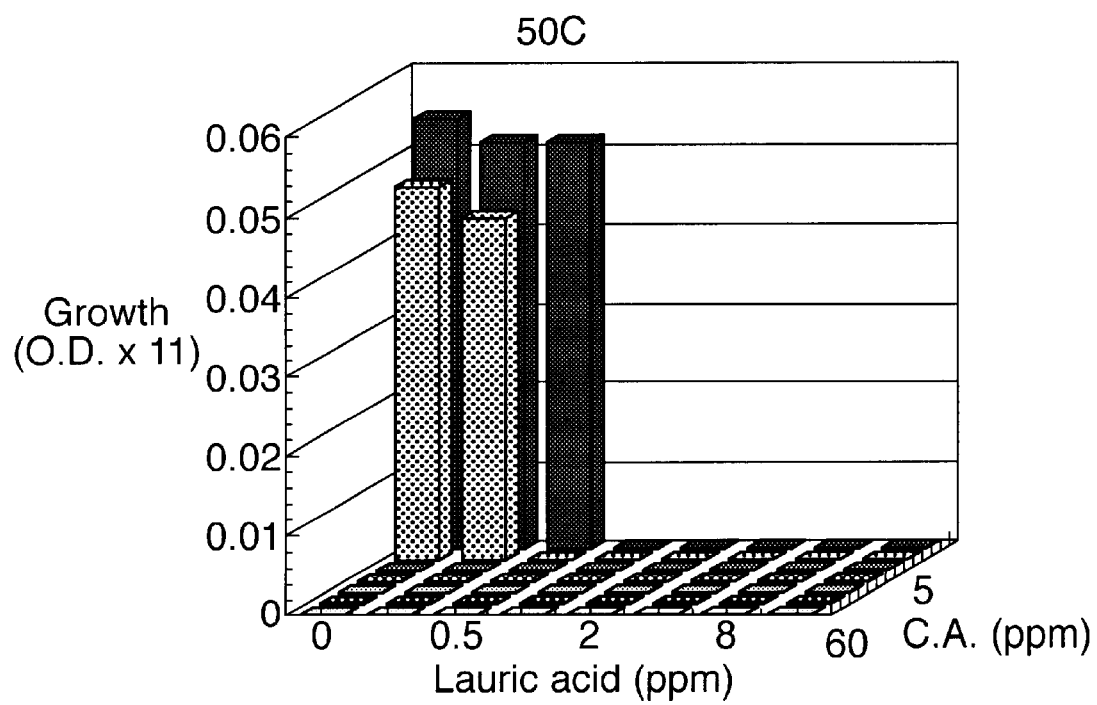

FIGS. 12a/b show the effect of pasteurisation adjunct, lauric alcohol, in combination with essential oil component, citral dimethyl acetal, applied in Ready to Drink tea, 0.14% tea, in combination with the preservative, cinnamic acid. Each matrix of 30 ml tubes containing 10 ml RTD tea, pH 3.4, all contained 100 ppm citral dimethyl acetal, lauric alcohol 0–12 ppm and cinnamic acid 0–60 ppm. Tubes were equilibrated at the required temperature for 7 minutes in a water bath, before inoculation with 1 cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Heat+pasteurisation adjunct showed a remarkable combined synergistic effect, further enhanced by the presence of cinnamic acid and essential oil components, (compare with FIG. 4).

Figure 13A:
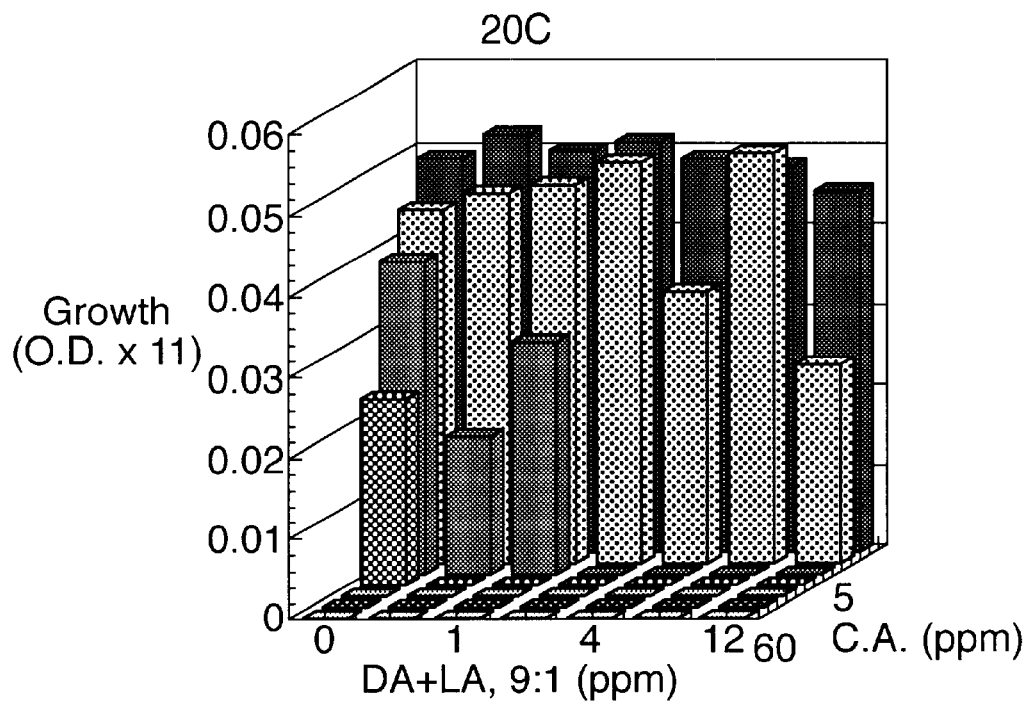
FIGS. 13a/b show the effect of mixed pasteurisation adjuncts, decyl acetate+lauric acid, in combination with essential oil component, citral dimethyl acetal, applied in Ready to Drink tea, 0.14% tea, in combination with the preservative, cinnamic acid.
Figure 13B:
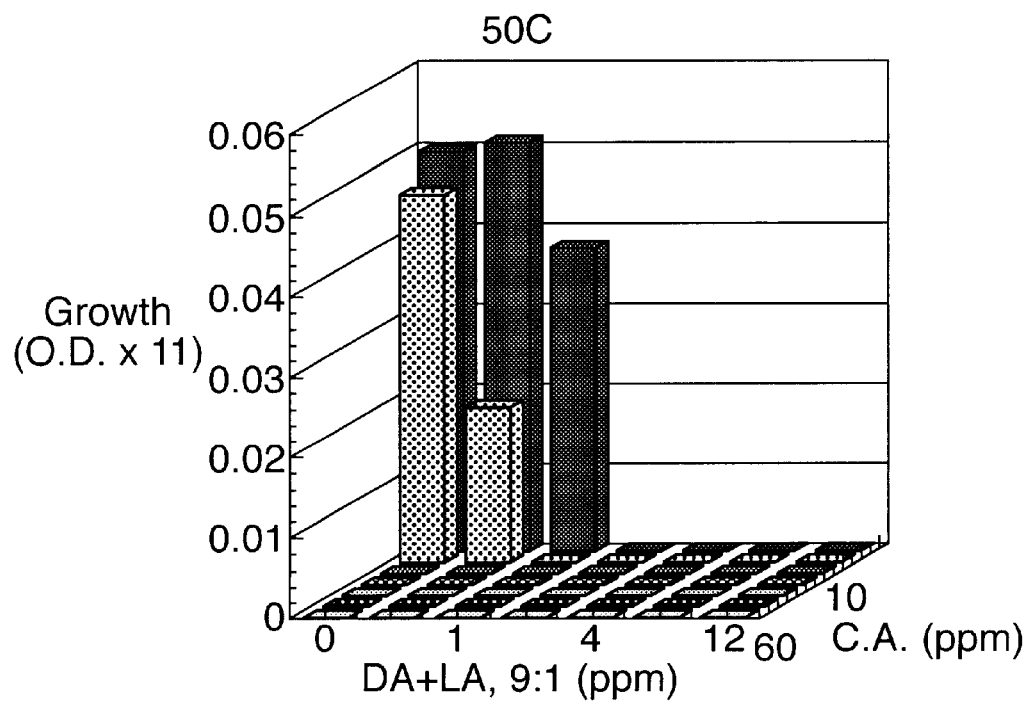

FIGS. 13a/b show the effect of mixed pasteurisation adjuncts, decyl acetate+lauric acid, in combination with essential oil component, citral dimethyl acetal, applied in Ready to Drink tea, 0.14% tea, in combination with the preservative, cinnamic acid. Each matrix of 30 ml tubes containing 10 ml RTD tea, pH 3.4, all contained 100 ppm citral dimethyl acetal, decyl acetate+lauric acid (9:1 ratio) 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Heat+pasteurisation adjunct showed a remarkable combined synergistic effect, further enhanced by the presence of cinnamic acid and essential oil components, (compare with FIG. 5).

Figure 14A:
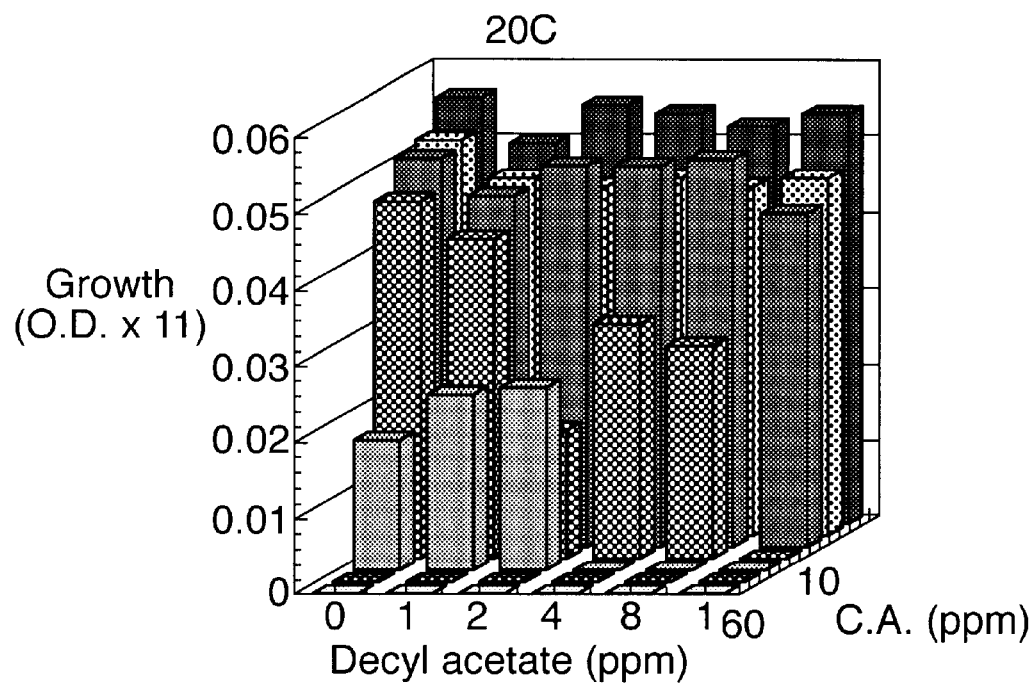
FIGS. 14a/b show the effect of pasteurisation adjunct, decyl acetate, in combination with essential oil components, citral dimethyl acetal and cumic alcohol, applied in Ready to Drink tea, 0.14% tea, in combination with the preservative, cinnamic acid.
Figure 14B:
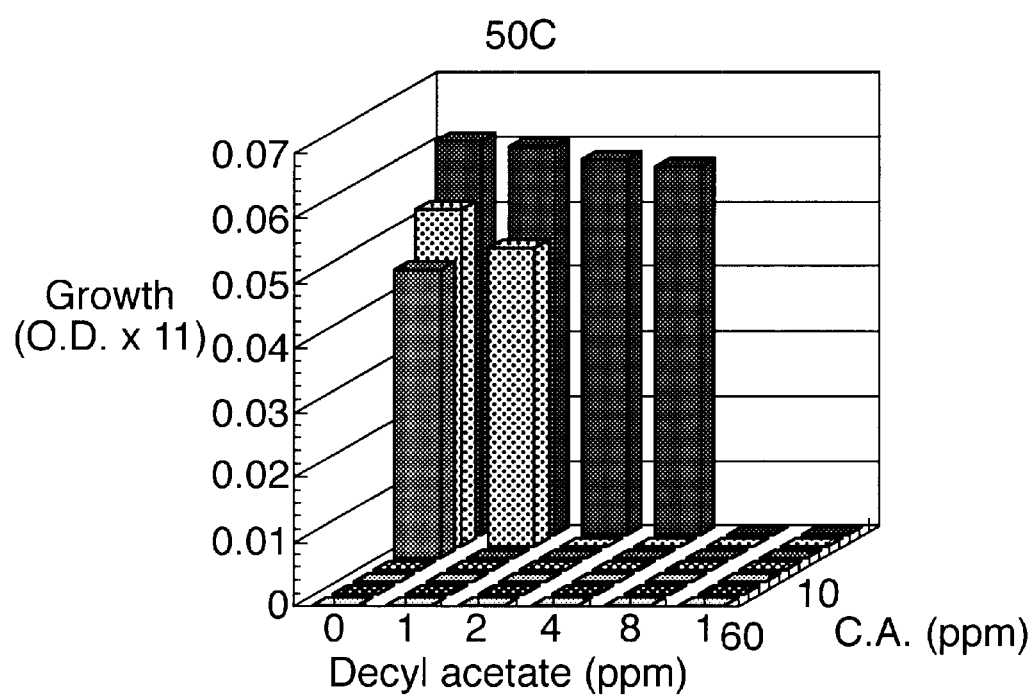

FIGS. 14a/b show the effect of pasteurisation adjunct, decyl acetate, in combination with essential oil components, citral dimethyl acetal and cumic alcohol, applied in Ready to Drink tea, 0.14% tea, in combination with the preservative, cinnamic acid. Each matrix of 30 ml tubes containing 10 ml RTD tea, pH 3.4, all contained 25 ppm citral dimethyl acetal, 35 ppm cumic alcohol, decyl acetate 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Heat+pasteurisation adjunct showed a remarkable combined synergistic effect, further enhanced by the presence of cinnamic acid and essential oil components, (compare with FIG. 2).

Figure 15A:
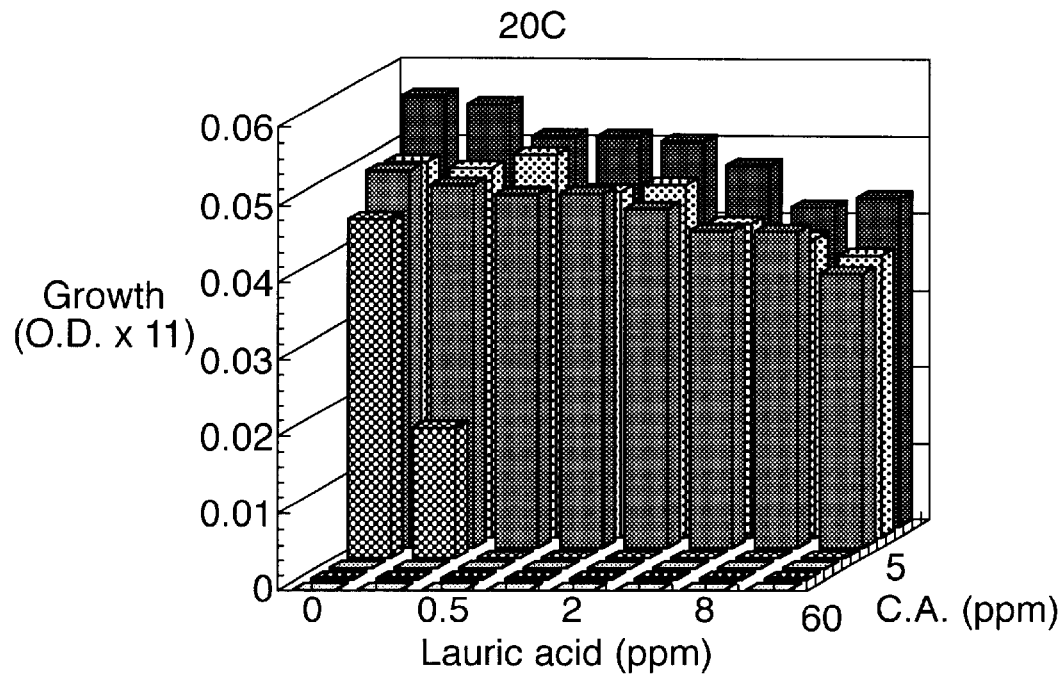
FIGS. 15a/b show the effect of pasteurisation adjunct, lauric acid, in combination with essential oil components, citral dimethyl acetal and cumic alcohol, applied in Ready to Drink tea, 0.14% tea, in combination with the preservative, cinnamic acid.
Figure 15B:
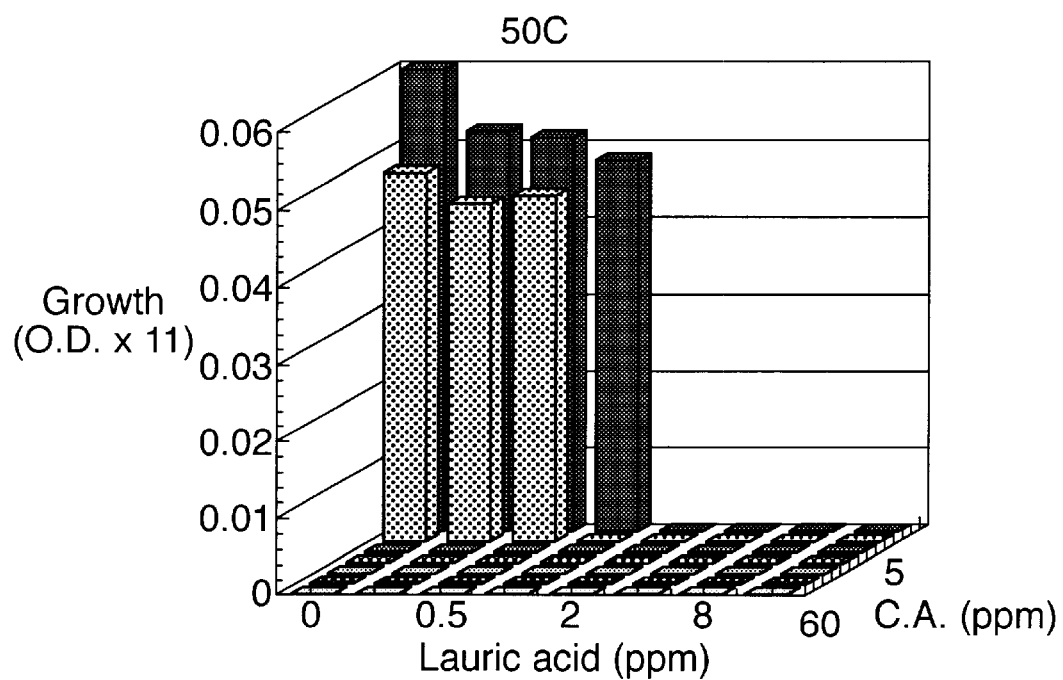

FIGS. 15a/b show the effect of pasteurisation adjunct, lauric acid, in combination with essential oil components, citral dimethyl acetal and cumic alcohol, applied in Ready to Drink tea, 0.14% tea, in combination with the preservative, cinnamic acid. Each matrix of 30 ml tubes containing 10 ml RTD tea, pH 3.4, all contained 25 ppm citral dimethyl acetal, 35 ppm cumic alcohol, lauric acid 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Heat+pasteurisation adjunct showed a remarkable combined synergistic effect, further enhanced by the presence of cinnamic acid and essential oil components, (compare with FIG. 3).

Figure 16A:
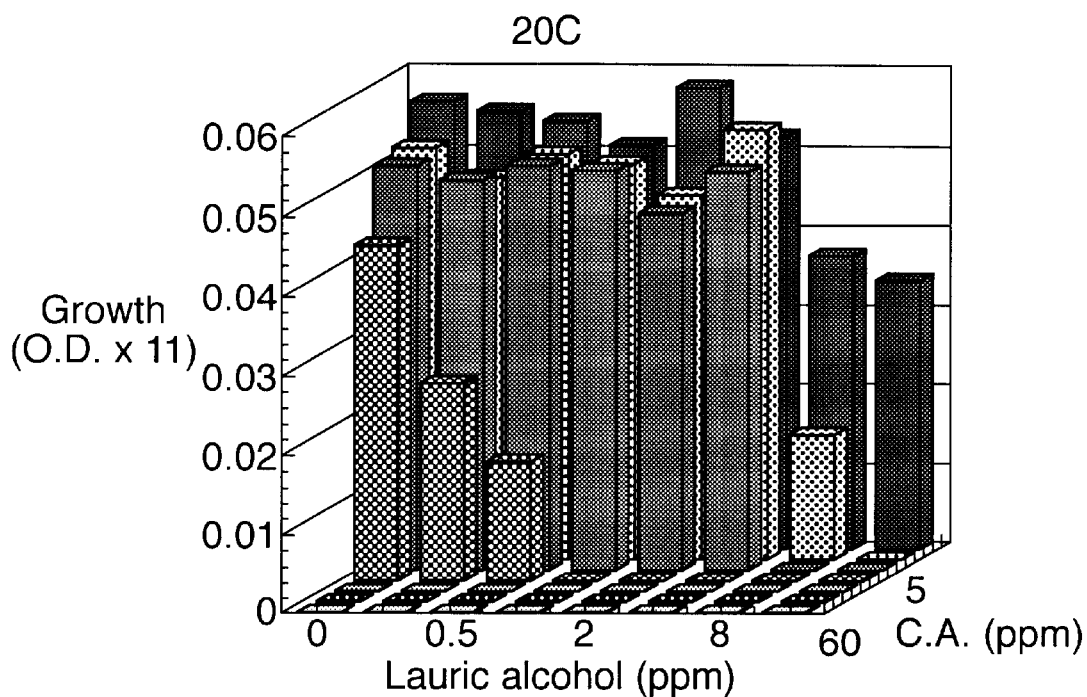
FIGS. 16a/b show the effect of pasteurisation adjunct, lauric alcohol, in combination with essential oil components, citral dimethyl acetal and cumic alcohol, applied in Ready to Drink tea, 0.14% tea, in combination with the preservative, cinnamic acid.
Figure 16B:
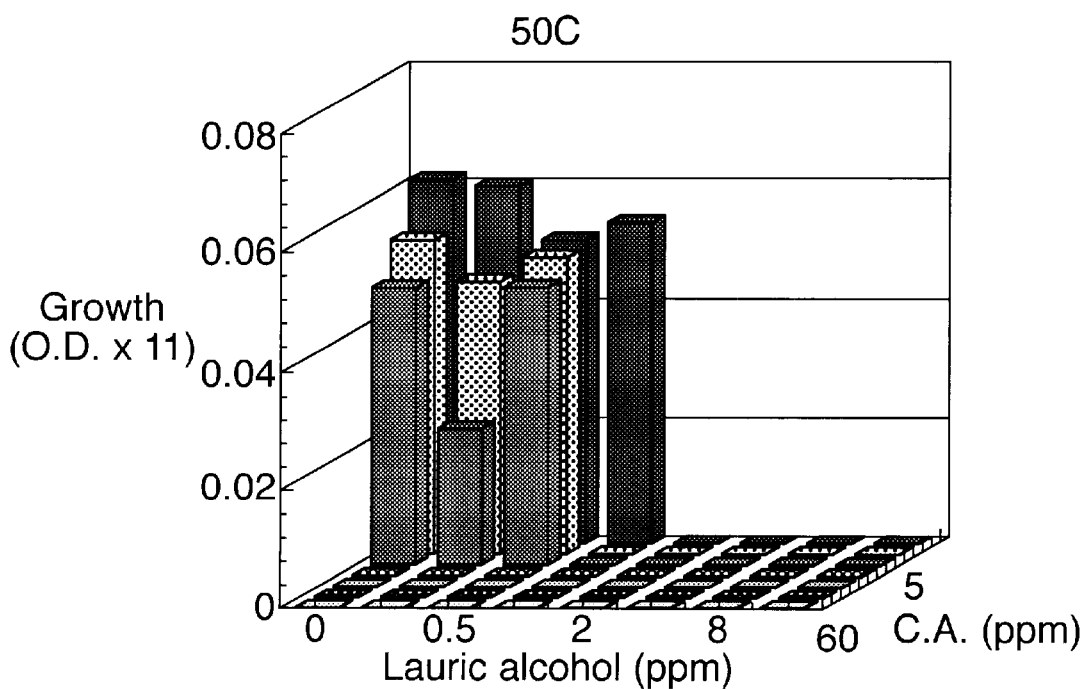

FIGS. 16a/b show the effect of pasteurisation adjunct, lauric alcohol, in combination with essential oil components, citral dimethyl acetal and cumic alcohol, applied in Ready to Drink tea, 0.14% tea, in combination with the preservative, cinnamic acid. Each matrix of 30 ml tubes containing 10 ml RTD tea, pH 3.4, all contained 25 ppm citral dimethyl acetal, 35 ppm cumic alcohol, lauric alcohol 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Heat+pasteurisation adjunct showed a remarkable combined synergistic effect, further enhanced by the presence of cinnamic acid and essential oil components, (compare with FIG. 4).

Figure 17A:
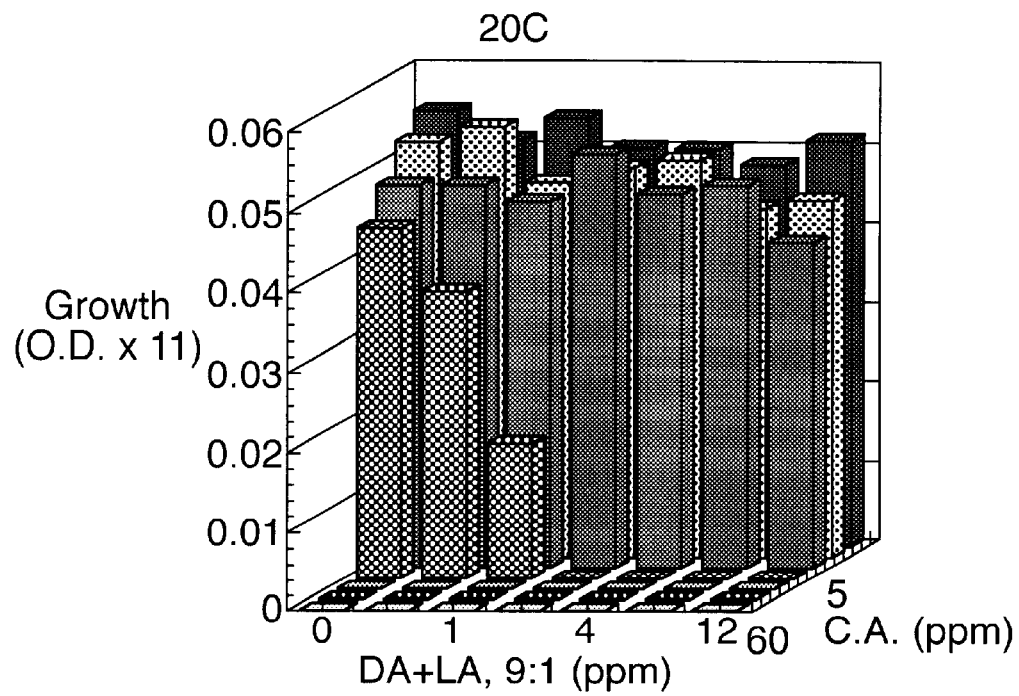
FIGS. 17a/b show the effect of mixed pasteurisation adjuncts, decyl acetate+lauric acid, in combination with essential oil components, citral dimethyl acetal and cumic alcohol, applied in Ready to Drink tea, 0.14% tea, in combination with the preservative, cinnamic acid.
Figure 17B:
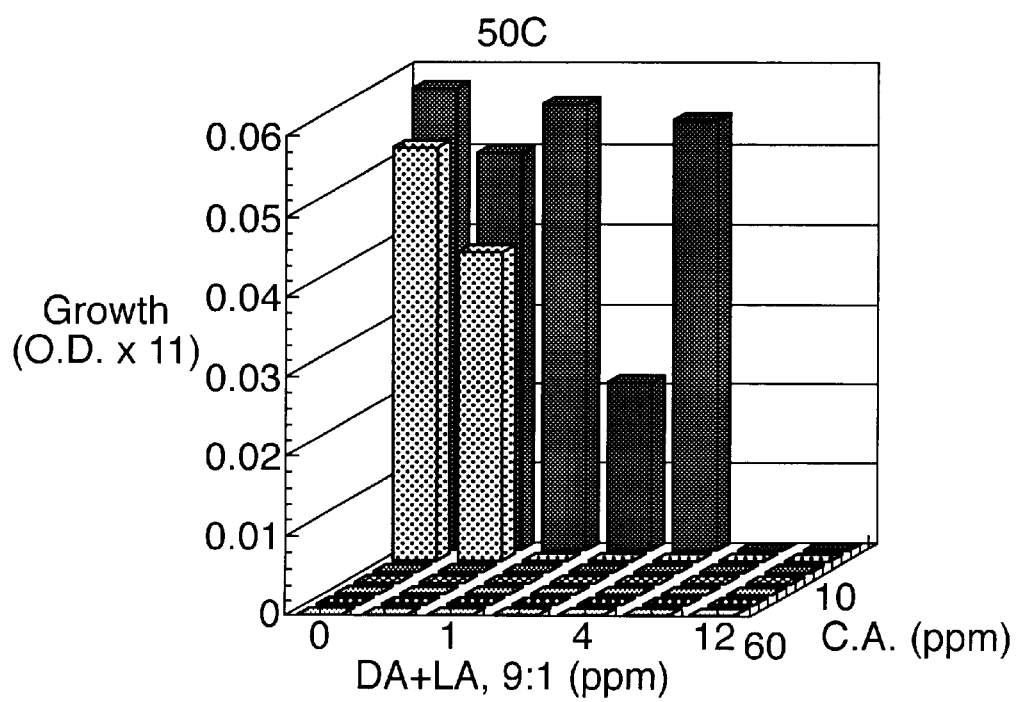

FIGS. 17a/b show the effect of mixed pasteurisation adjuncts, decyl acetate+lauric acid, in combination with essential oil components, citral dimethyl acetal and cumic alcohol, applied in Ready to Drink tea, 0.14% tea, in combination with the preservative, cinnamic acid. Each matrix of 30 ml tubes containing 10 ml RTD tea, pH 3.4, all contained 25 ppm citral dimethyl acetal, 35 ppm cumic alcohol, decyl acetate+lauric acid (9:1 ratio) 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Heat+pasteurisation adjunct showed a remarkable combined synergistic effect, further enhanced by the presence of cinnamic acid and essential oil components, (compare with FIG. 5).

EXAMPLE 2

Synthetic Soft Drink Experiments

Figure 18A:
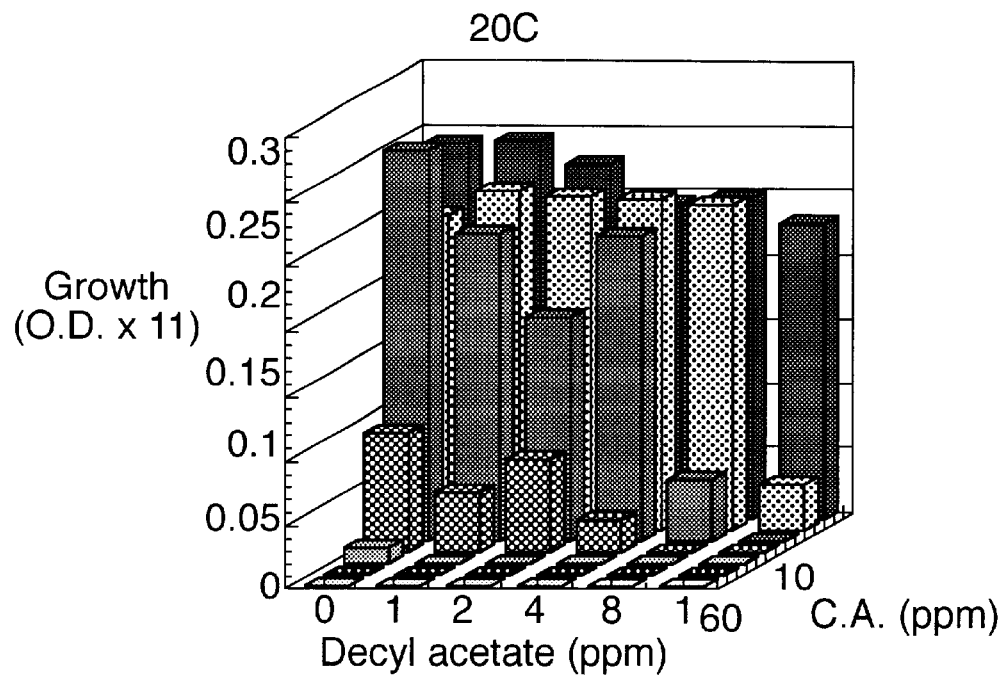
FIGS. 18a/b show the effect of pasteurisation adjunct, decyl acetate, in combination with essential oil components, citral dimethyl acetal and cumic alcohol, applied in synthetic soft drink, in combination with the preservative, cinnamic acid.
Figure 18B:
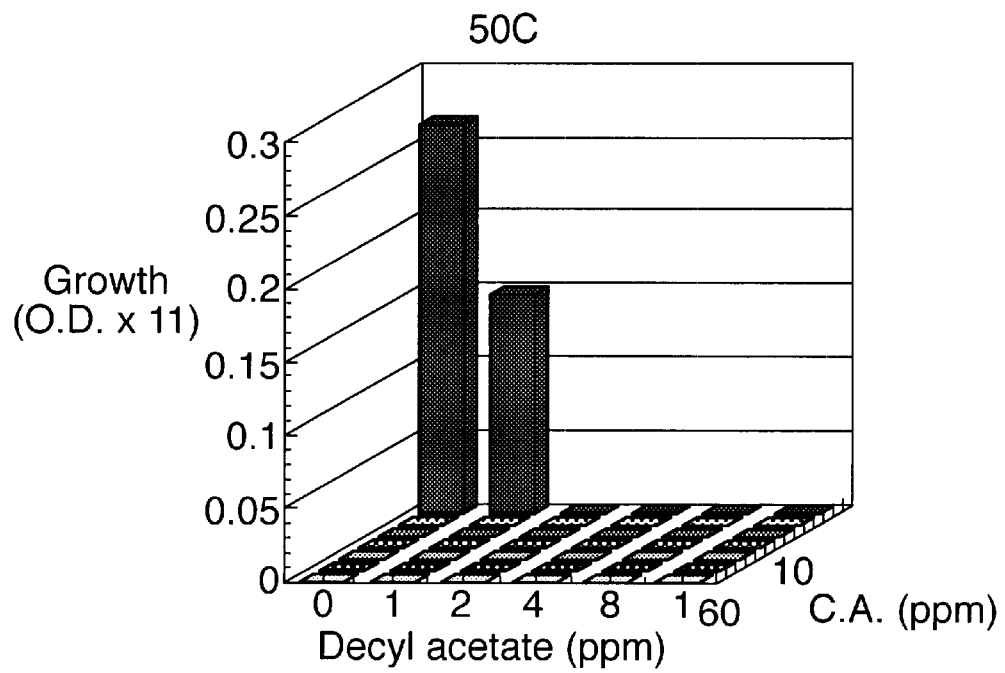

FIGS. 18a/b show the effect of pasteurisation adjunct, decyl acetate, in combination with essential oil components, citral dimethyl acetal and cumic alcohol, applied in synthetic soft drink, in combination with the preservative, cinnamic acid. Synthetic soft drink contained glucose, 8%w/v, citric acid 3 g/l, potassium orthophosphate 1 g/l, magnesium chloride 0.1 g/g and yeast extract 0.1 g/l. Each matrix of 30 ml tubes containing 10 ml synthetic soft drink, pH 3.4, all contained 25 ppm citral dimethyl acetal, 35 ppm cumic alcohol, decyl acetate 0–12 ppm and cinnamic acid 0–60 ppm. Tubes were equilibrated at the required temperature for 7 minutes in a water bath, before inoculation with $10^4$ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Heat+pasteurisation adjunct showed a remarkable combined synergistic effect, further enhanced by the presence of cinnamic acid and essential oil components, (compare with FIG. 2).

Figure 19A:
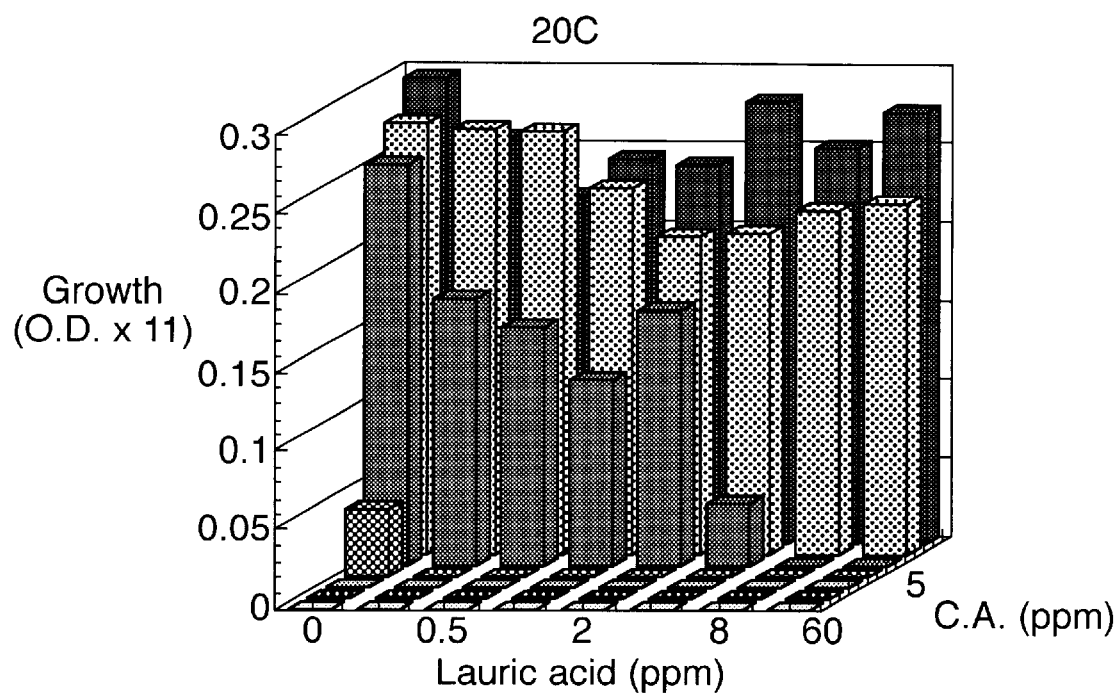
FIGS. 19a/b show the effect of pasteurisation adjunct, lauric acid, in combination with essential oil components, citral dimethyl acetal and cumic alcohol, applied in synthetic soft drink, in combination with the preservative, cinnamic acid.
Figure 19B:
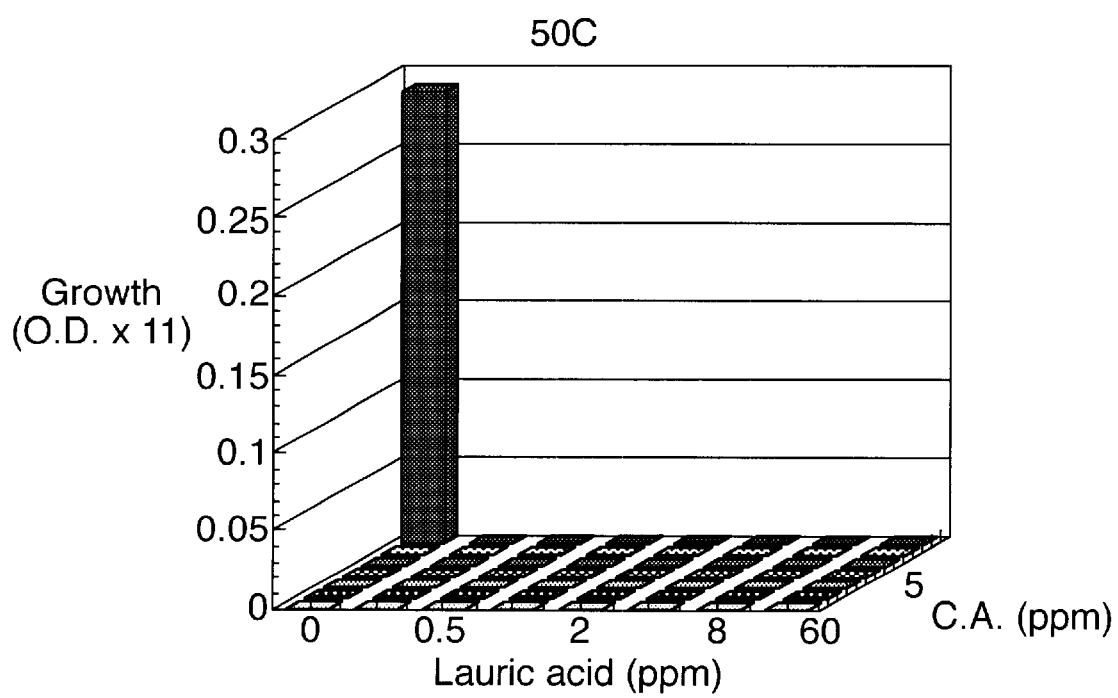

FIGS. 19a/b show the effect of pasteurisation adjunct, lauric acid, in combination with essential oil components, citral dimethyl acetal and cumic alcohol, applied in synthetic soft drink, in combination with the preservative, cinnamic acid. Synthetic soft drink contained glucose, 8%w/v, citric acid 3 g/l, potassium orthophosphate 1 g/l, magnesium chloride 0.1 g/g and yeast extract 0.1 g/l. Each matrix of 30 ml tubes containing 10 ml synthetic soft drink, pH 3.4, all contained 25 ppm citral dimethyl acetal, 35 ppm cumic alcohol, lauric acid 0–12 ppm and cinnamic acid 0–60 ppm. Tubes were equilibrated at the required temperature for 7 minutes in a water bath, before inoculation with cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Heat+pasteurisation adjunct showed a remarkable combined synergistic effect, further enhanced by the presence of cinnamic acid and essential oil components, (compare with FIG. 3).

EXAMPLE 3

Sorbic Acid and Benzoic Acid Experiments

Figure 20A:
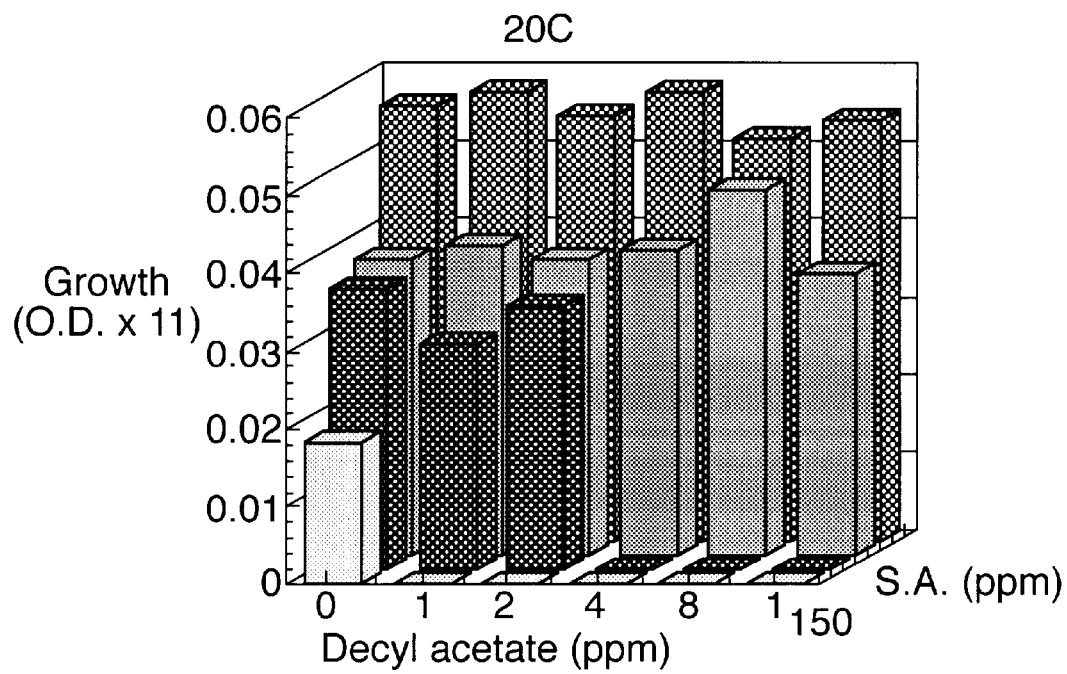
FIGS. 20a/b show the effect of pasteurisation adjunct, decyl acetate, in combination with essential oil components, citral dimethyl acetal and cumic alcohol, applied in Ready to Drink tea, 0.14% tea, in combination with the preservative, sorbic acid.
Figure 20B:
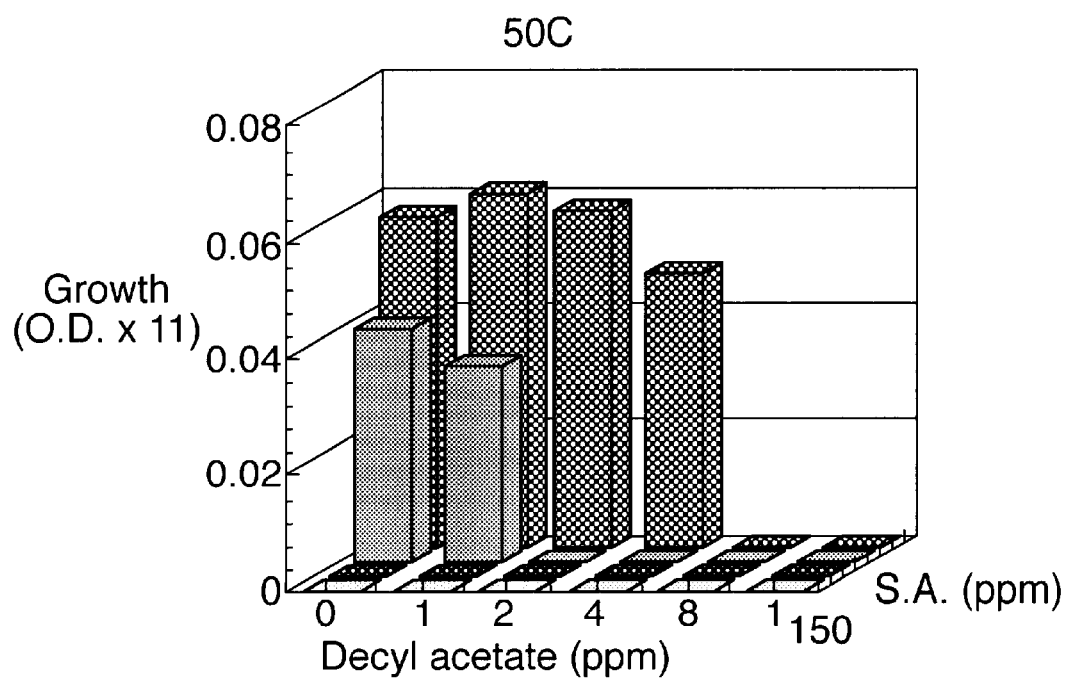

FIGS. 20a/b show the effect of pasteurisation adjunct, decyl acetate, in combination with essential oil components, citral dimethyl acetal and cumic alcohol, applied in Ready to Drink tea, 0.14% tea, in combination with the preservative, sorbic acid. Each matrix of 30 ml tubes containing 10 ml RTD tea, pH 3.4, all contained 25 ppm citral dimethyl acetal, 35 ppm cumic alcohol, decyl acetate 0–12 ppm and sorbic acid 0–150 ppm. Tubes were equilibrated at the required temperature for 7 minutes in a water bath, before inoculation with 10⁴ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Heat+pasteurisation adjunct showed a remarkable combined synergistic effect, further enhanced by the presence of sorbic acid and essential oil components, (compare with FIG. 2.

Figure 21A:
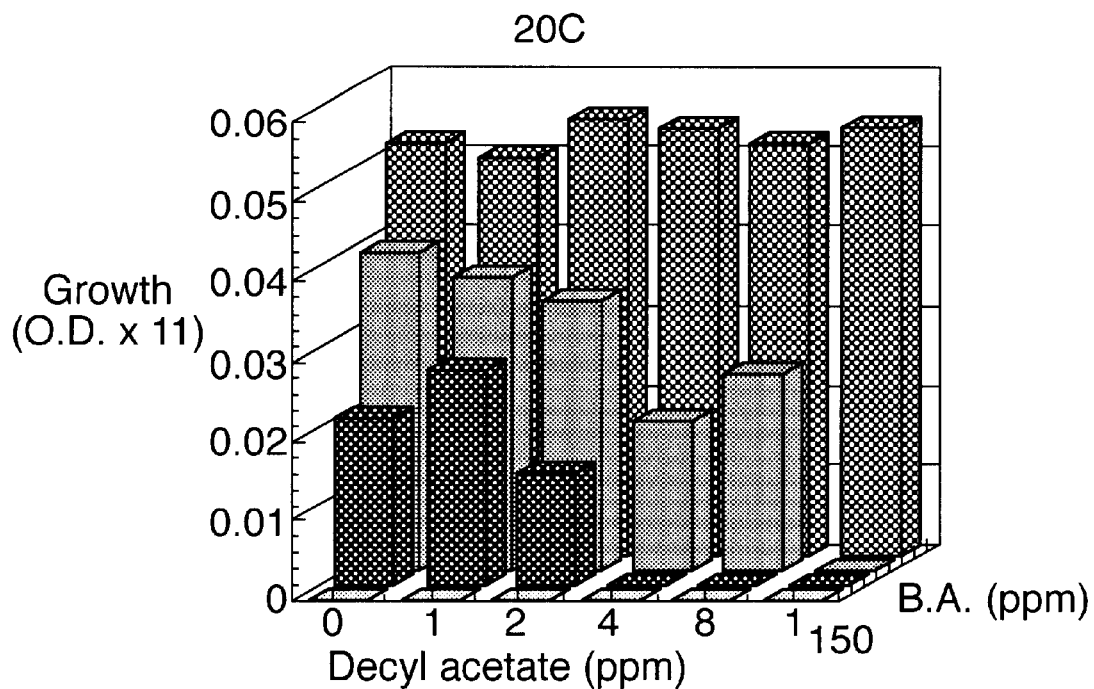
FIGS. 21a/b show the effect of pasteurisation adjunct, decyl acetate, in combination with essential oil components, citral dimethyl acetal and cumic alcohol, applied in Ready to Drink tea, 0.14% tea, in combination with the preservative, benzoic acid.
Figure 21B:
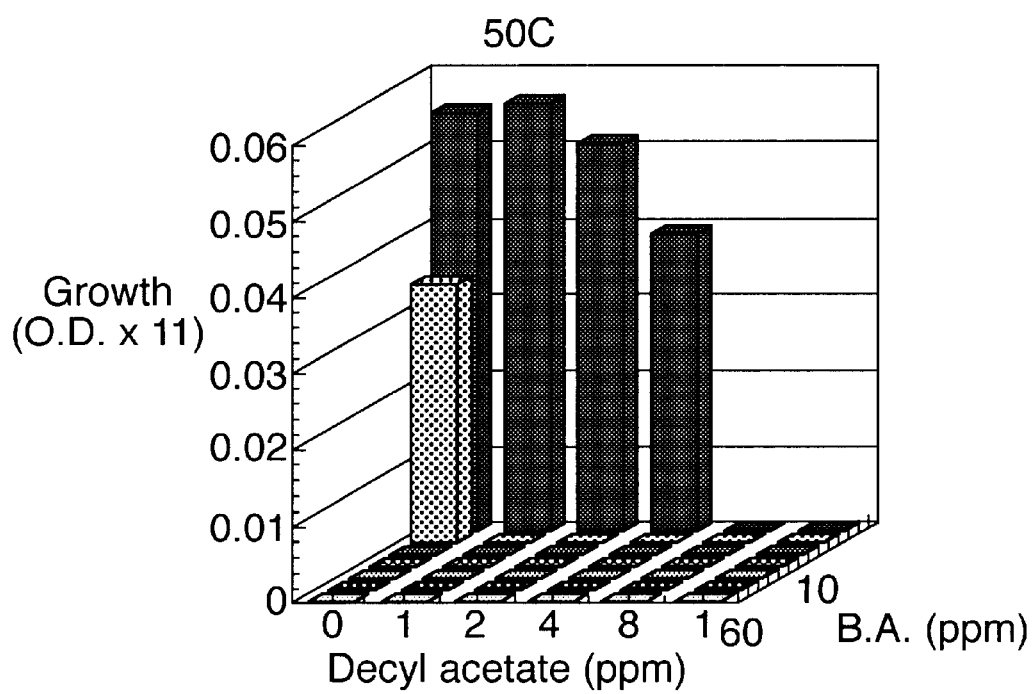

FIGS. 21a/b show the effect of pasteurisation adjunct, decyl acetate, in combination with essential oil components, citral dimethyl acetal and cumic alcohol, applied in Ready to Drink tea, 0.14% tea, in combination with the preservative, benzoic acid. Each matrix of 30 ml tubes containing 10 ml RTD tea, pH 3.4, all contained 25 ppm citral dimethyl acetal, 35 ppm cumic alcohol, decyl acetate 0–12 ppm and benzoic acid 0–150 ppm. Tubes were equilibrated at the required temperature for 7 minutes in a water bath, before inoculation with 10⁴ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples.

Heat+pasteurisation adjunct showed a remarkable combined synergistic effect, further enhanced by the presence of benzoic acid and essential oil components, (compare with FIG. 1).

EXAMPLE 4
Various Pasteurisation Adjuncts Experiments

Figure 22A:
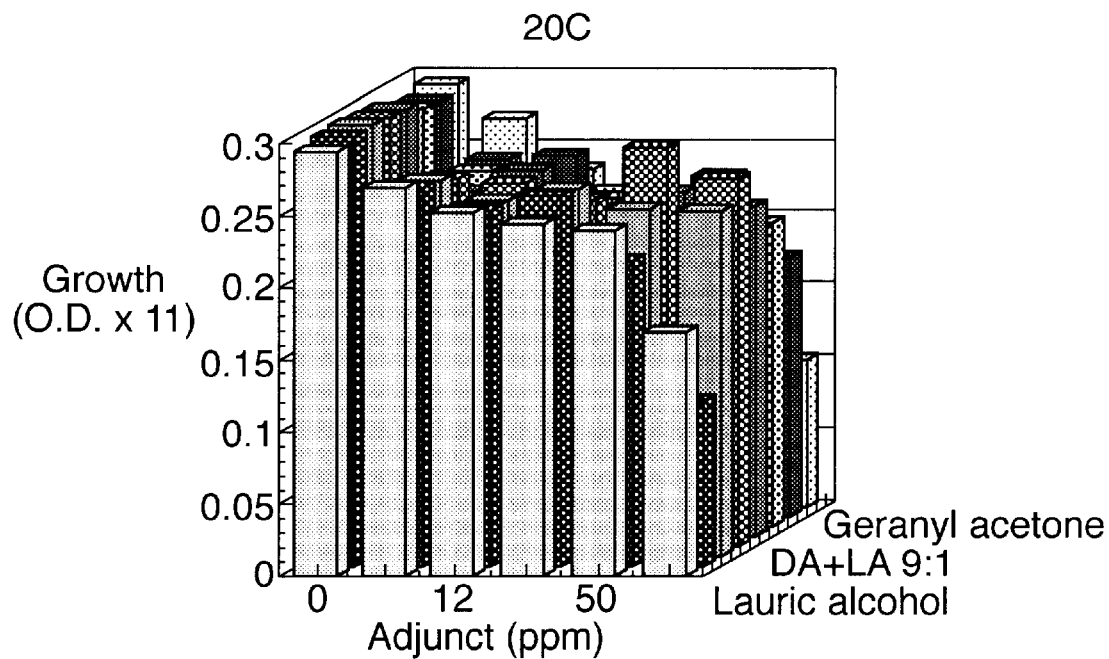
FIGS. 22a/b show the effect of various pasteurisation adjuncts applied at 0–100 ppm in synthetic soft drink, zero tea content.
Figure 22B:
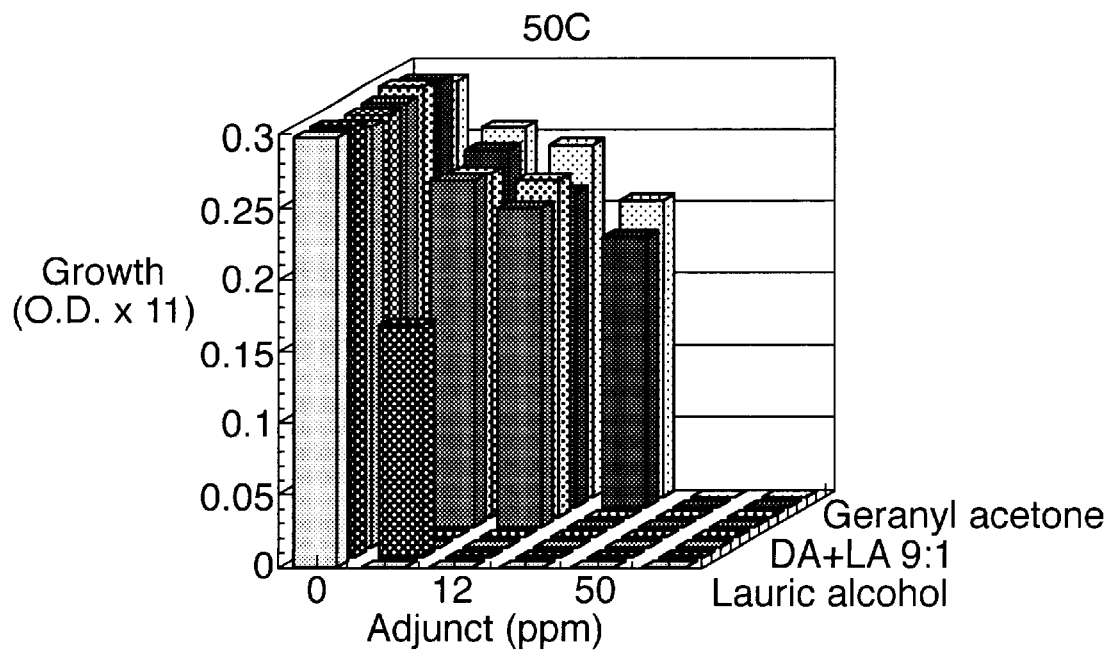

FIGS. 22a/b show the effect of various pasteurisation adjuncts applied at 0–100 ppm in synthetic soft drink, zero tea content. Synthetic soft drink contained glucose, 8%w/v, citric acid 3 /l, potassium orthophosphate 1 g/l, magnesium chloride 0.1 g/g and yeast extract 0.1 g/l. Rows of 30 ml tubes containing 10 ml synthetic soft drink, pH 3.4, were equilibrated at the required temperature for 7 minutes in a water bath, before inoculation with 10⁴ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples. The pasteurisation adjuncts had little effect at low temperature on yeast growth.

50° C. temperature+pasteurisation adjuncts showed a remarkable combined synergistic effect.

EXAMPLE 5
Effect of Temperature on Pasteurisation Adjuncts Experiments

Figure 23:
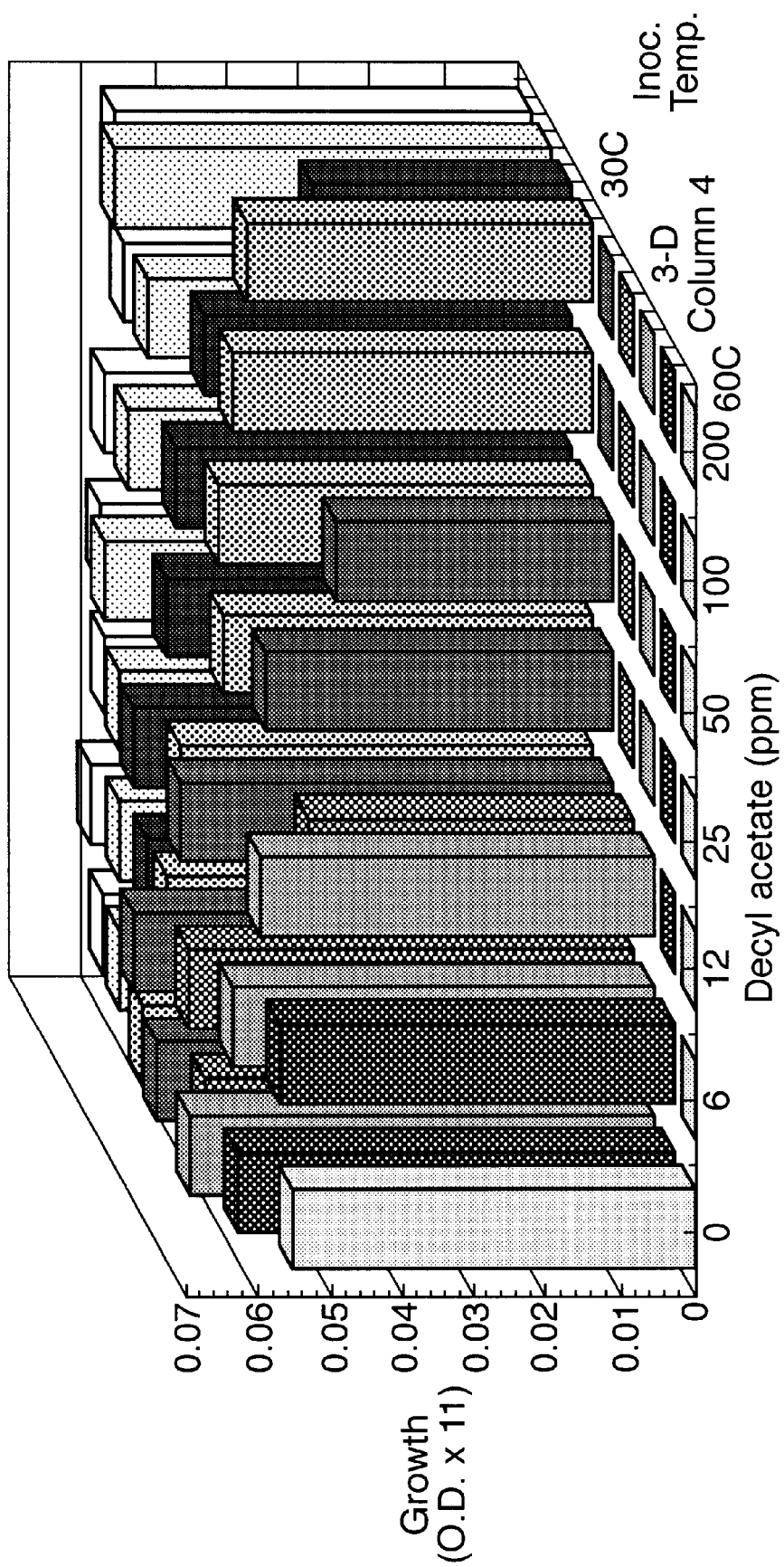
FIG. 23 shows the effect of temperature on pasteurisation adjunct, decyl acetate, applied at 0–200 ppm in Ready to Drink tea, 0.14% tea.

FIG. 23 shows the effect of temperature on pasteurisation adjunct, decyl acetate, applied at 0–200 ppm in Ready to Drink tea, 0.14% tea. Rows of 30 ml tubes containing 10 ml RTD tea, pH 3.4, were equilibrated at the required temperature for 7 minutes in a water bath, before inoculation with 10⁴ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples. The pasteurisation adjunct had little effect at low temperature on yeast growth as did heat up to 60° C., without pasteurisation adjunct.

Heat+pasteurisation adjunct showed a remarkable combined synergistic effect.

Figure 24:
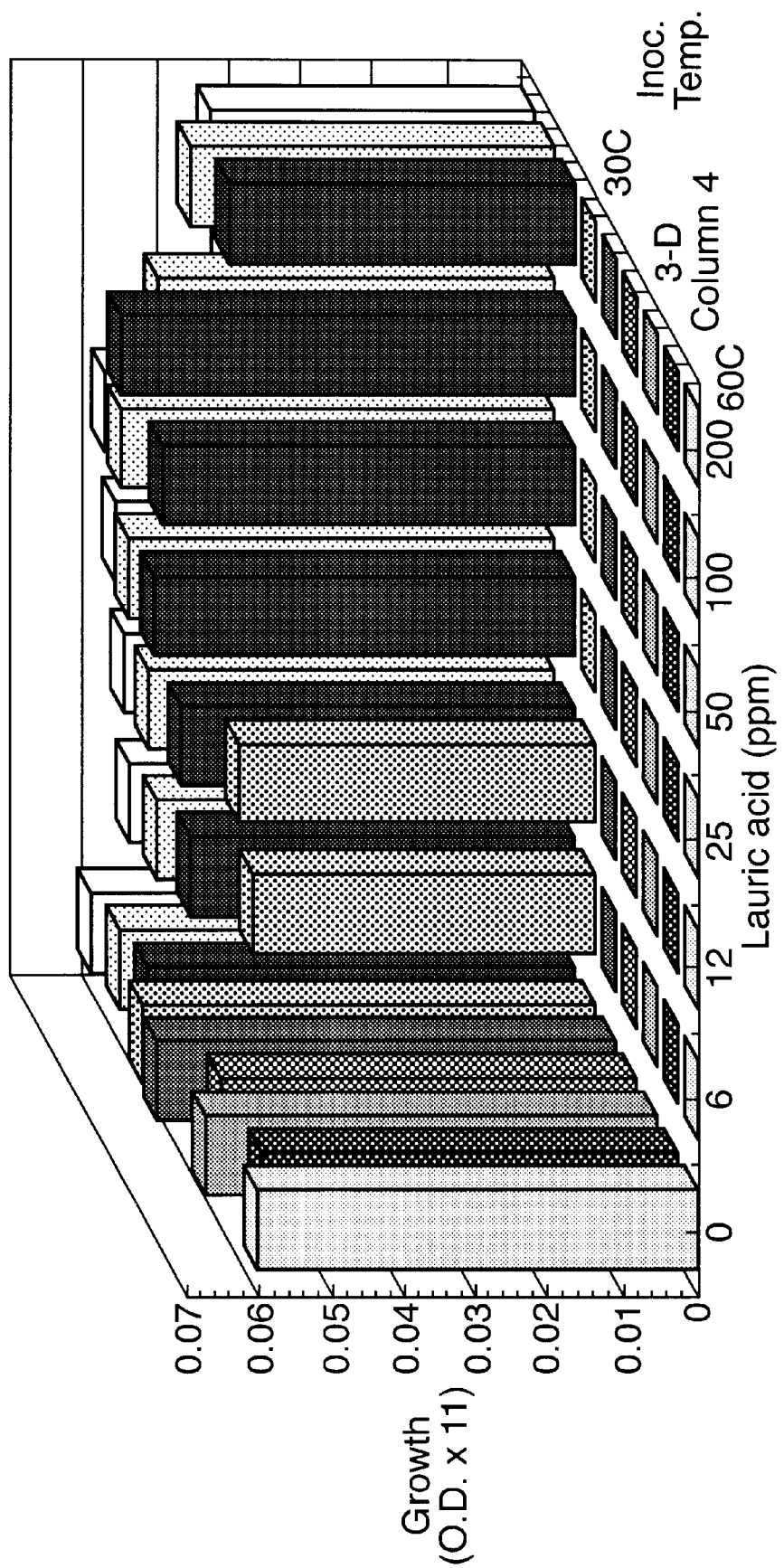
FIG. 24 shows the effect of temperature on pasteurisation adjunct, lauric acid, applied at 0–200 ppm in Ready to Drink tea, 0.14% tea.

FIG. 24 shows the effect of temperature on pasteurisation adjunct, lauric acid, applied at 0–200 ppm in Ready to Drink tea, 0.14% tea. Rows of 30 ml tubes containing 10 ml RTD tea, pH 3.4, were equilibrated at the required temperature for 7 minutes in a water bath, before inoculation with 10⁴ cells/ml of the yeast *Saccharomyces cerevisiae* X2180-1B. Tubes were held at temperature for 2 minutes before being cooled rapidly in cold water for 5 minutes. Tubes were then incubated for 14 days at 25° C. to allow surviving yeasts to grow out. At 14 days growth was measured by optical density at 600 nm in x11 diluted samples. The pasteurisation adjunct had little effect at low temperature on yeast growth as did heat up to 60° C., without pasteurisation adjunct.

Heat+pasteurisation adjunct showed a remarkable combined synergistic effect.

What is claimed is:

1. An ambient stable beverage that contains a preservative system that comprises cinnamic acid, one or more essential oils and one or more pasteurisation adjuncts that become fungicidal when activated by heat.

2. A beverage according to claim 1 wherein the beverage contains 1 to 175 ppm cinnamic acid.

3. A beverage according to claim 2 wherein the beverage contains 1 to 60 ppm cinnamic acid.

4. A beverage according to claim 1 wherein the essential oil is selected from the group consisting of benzyl-4-hydroxybenzoate, 4-tert-butylcyclohexanone, carvone, cinnamaldehyde, cinnamic acid, citral, citral dimethyl acetal, citronellol, cumic alcohol, cyclohexanebutyric acid, 2-cyclohexylethyl acetate, trans,trans-2,4-decadienal, decanal, decanol, dihydrocarveol, 3,7-dimethyl-1-octanol, ethyl cyclohexanepropionate, ethyl pyruvate, ethyl vanillin, jasmone, o-methoxycinnamaldehyde, methyl anthranilate, α-methyl-trans-cinnamaldehyde, methyl eugenol, methyl nonanoate, 2-methyl-2-pentenal, 5-methyl-2-phenyl-2-hexenal, methyl salicylate, 4-methyl-5-thiazoleethanol acetate, myrtenol, neomenthol, nonanoic acid, γ-nonanoic lactone, δ-octalactone, octanoic acid (caprylic), 1-octanol, 1-phenyl-1,2-propanedione, piperonyl acetate, propyl benzoate, pulegone, sorbic aldehyde (2,4-hexadienal), terpinen-4-ol, tolualdehyde, γ-undecalactone, undecanal, 1-undecanol, and vanillin.

5. A beverage according to claim 4 wherein the essential oil is selected from the group consisting of cinnamic acid, citral, citral dimethyl acetal, cumic alcohol (isopropylbenzyl alcohol), trans,trans-2,4-decadienal, 3,7-dimethyl-1-octanol, ethyl pyruvate, myrtenol and piperonyl acetate.

6. A beverage according to claim 1 wherein the preservative system contains 1 to 100 ppm of one or more of the essential oils.

7. A beverage according to claim 1 wherein the pasteurisation adjunct is a substance that has no appreciable fungicidal activity at a temperature between 0 and 40° C.

8. A beverage according to claim 7 wherein the pasteurisation adjunct has no appreciable fungicidal activity at a temperature between 20 and 35° C.

9. A beverage according to claim 8 wherein the pasteurisation adjunct exhibits fungicidal activity when heated to a temperature between 40 and 65° C.

10. A beverage according to claim 9 wherein the pasteurisation adjunct exhibits fungicidal activity when heated to a temperature between 45 and 55° C.

11. A beverage according to claim 1 wherein the pasteurisation adjunct is selected from the group consisting of allyl cyclohexanepropionate, amyl hexanoate, amyl octanoate, benzoin, benzyl benzoate, benzyl salicylate, bornyl acetate, butyl heptanoate, butyl laurate, butyl 10-undecenoate carvyl propionate, β-caryophylene, decyl acetate, decyl butyrate, decyl propionate, 2-dodecenal, ethyl decanoate, ethyl 2-decenoate, ethyl laurate, ethyl nonanoate, ethyl tridecanoate, ethyl undecanoate, ethyl 10-undecenoate, geranyl acetate, geranylacetone, geranyl butyrate, geranyl propionate, heptyl butyrate, w-6-hexadecalactone, hexadecanol, hexyl hexanoate, hexyl octanoate, isoamyl hexanoate, isoamyl laurate, isoamyl salicylate, lauric acid, lauric alcohol, lauric aldehyde, lauryl acetate, linalyl acetate, linalyl propionate, methyl decanoate, methyl laurate, methyl myristate, methyl nonanoate, methyl undecanoate, methyl-9-undecenoate, mristaldehyde, myristic acid, nerolidol, neryl butyrate, neryl isobutyrate, nonyl acetate, octyl butyrate, w-pentadecalactone, pentadecanoic acid, pentadecanol, phenethyl hexanoate, phenethyl octanoate, 2-phenoxylethyl isobutyrate, tetradecanol, tridecanal, tridecanoic acid, tridecanol, 2-tridecenal and 2-undecanone.

12. A beverage according to claim 11 wherein the pasteurisation adjunct is selected from the group consisting of allyl cyclohexanepropionate, amyl hexanoate, butyl heptanoate, decyl acetate, decyl propionate, 2-dodecenal, ethyl decanoate ethyl 2-decenoate, ethyl nonanoate, ethyl 10-undecenoate, geranyl acetate, geranylacetone, geranyl butyrate, geranyl propionate, heptyl butyrate, hexyl hexanoate, isoamyl hexanoate, lauric acid, lauric alcohol, lauric aldehyde, methyl decanoate, methyl laurate, methyl nonanoate, methyl undecanoate, methyl-9-undecenoate, myristic acid, nerolidol, neryl isobutyrate, nonyl acetate, octyl butyrate, phenethyl hexanoate, 2-phenoxylethyl isobutyrate, tridecanal, tridecanoic acid, tridecanol, 2-tridecenal and 2-undecanone.

13. A beverage according to claim 12 wherein the pasteurisation adjunct is selected from the group consisting of decyl acetate, lauric acid, lauric aldehyde, lauric alcohol, 2-dodecenal, ethyl 2-decenoate, geranyl acetone and geranyl acetate.

14. A beverage according to claim 1 wherein the pasteurisation adjunct is a compound that has a molecular weight between 170 and 230 daltons and a $logP_{oct}$ value between 3.5 and 5.5.

15. A beverage according to claim 1 wherein the pasteurisation adjunct is present in a concentration no greater than 1 mM.

16. A beverage according to claim 1 wherein the beverage is tea based.

17. A beverage according to claim 16 wherein the beverage contains 0.01 to 3% tea solids.

18. A beverage according to claim 1 wherein the pasteurisation adjunct also becomes antibacterial when activated by heat.

19. A beverage according to claim 1 wherein the pasteurisation adjunct is present in a concentration no greater than 0.1 mM.

* * * * *